United States Patent
Natroshvili et al.

(10) Patent No.: US 10,754,032 B2
(45) Date of Patent: Aug. 25, 2020

(54) PERCEPTION DEVICE

(71) Applicant: Intel Corporation, Santa Clara, CA (US)

(72) Inventors: Koba Natroshvili, Waldbronn (DE); Klaus Uhl, Karlsruhe (DE)

(73) Assignee: Intel Corporation, Santa Clara, CA (US)

(*) Notice: Subject to any disclaimer, the term of this patent is extended or adjusted under 35 U.S.C. 154(b) by 245 days.

(21) Appl. No.: 16/014,013

(22) Filed: Jun. 21, 2018

(65) Prior Publication Data

US 2019/0049580 A1 Feb. 14, 2019

(51) Int. Cl.
*G01S 17/04* (2020.01)
*G01S 19/42* (2010.01)
(Continued)

(52) U.S. Cl.
CPC ............. *G01S 17/04* (2020.01); *B60W 40/04* (2013.01); *B60W 40/10* (2013.01); *G01C 21/28* (2013.01);
(Continued)

(58) Field of Classification Search
CPC ............. G06K 9/00664; G06K 9/6215; G06K 9/00671; G06K 9/00791; G06K 9/4676; G06K 9/2018; G06K 9/00838; G05D 1/0274; G05D 1/0251; G05D 1/0253; G05D 1/0044; G05D 1/0246; G05D 1/027;
(Continued)

(56) References Cited

U.S. PATENT DOCUMENTS

| 2008/0157940 A1* | 7/2008 | Breed | B60N 2/853 |
| | | | 340/425.5 |
| 2015/0310146 A1* | 10/2015 | Tanzmeister | G08G 1/165 |
| | | | 703/2 |

(Continued)

OTHER PUBLICATIONS

Radu Danescu et al., "Modeling and Tracking the Driving Environment With a Particle-Based Occupancy Grid", IEEE Transactions on Intelligent Transportation Systems, Dec. 2011, pp. 1331-1342, vol. 12, No. 4.
(Continued)

*Primary Examiner* — Behrang Badii
(74) *Attorney, Agent, or Firm* — Viering, Jentschura & Partner MBB

(57) ABSTRACT

A perception device including a receiver configured to receive sensor information including information about a location of one or more objects detected by a sensor; a memory configured to store an occupancy grid of a predetermined region, wherein the occupancy grid includes a plurality of grid cells, wherein each grid cell represents an area in the predetermined region, wherein at least one grid cell of the plurality of grid cells is associated with a respective single occupancy hypothesis; a single occupancy hypothesis determiner configured to determine a single occupancy hypothesis; wherein the single occupancy hypothesis includes degree of belief of occupancy of the grid cell depending on the sensor information; wherein a contribution of a sensor information value to the degree of belief of occupancy substantially decreases with an increase of a distance of the location of the object detected by the sensor from a center of the grid cell.

20 Claims, 9 Drawing Sheets

(51) Int. Cl.
*B60W 40/10* (2012.01)
*B60W 40/04* (2006.01)
*G01C 21/28* (2006.01)
*G01S 7/48* (2006.01)
*G01S 17/89* (2020.01)
*G01S 17/931* (2020.01)
*G01S 5/16* (2006.01)
*G05D 1/02* (2020.01)
*G01C 21/10* (2006.01)
*B60N 2/853* (2018.01)

(52) U.S. Cl.
CPC ............ *G01S 7/4808* (2013.01); *G01S 17/89* (2013.01); *G01S 17/931* (2020.01); *G01S 19/42* (2013.01); *B60N 2/853* (2018.02); *G01C 21/10* (2013.01); *G01S 5/16* (2013.01); *G05D 1/02* (2013.01)

(58) Field of Classification Search
CPC ........... B60R 21/0152; B60R 21/01552; G01S 17/04; G01S 5/16; G01S 17/931; G01S 7/4808; G01S 17/89; G01S 19/42; G01C 21/10; G01C 21/165; G01C 21/005; G01C 21/28; G01C 21/26; G01C 21/3658; H04N 5/2353; H04N 5/232; H04N 13/261; G06T 7/73; G06T 7/246; G06T 7/579; B60W 40/04; B60W 40/10; G08G 1/142; G08G 1/09; G08G 1/166; G08G 1/167; G08G 9/02; G08G 1/096791; H04W 56/0035; H04W 74/0816; H04W 4/027; H04W 72/0446; H04L 5/0091
See application file for complete search history.

(56) References Cited

U.S. PATENT DOCUMENTS

| 2018/0203445 | A1* | 7/2018 | Micks ................... G06F 30/15 |
| 2018/0252535 | A1* | 9/2018 | Bhimavarapu ......... G01P 3/465 |
| 2018/0284802 | A1* | 10/2018 | Tsai ................... G06K 9/00664 |
| 2019/0193629 | A1* | 6/2019 | Zevenbergen ....... G01C 21/206 |
| 2019/0194005 | A1* | 6/2019 | Shah .................... B66F 9/0755 |

OTHER PUBLICATIONS

Georg Tanzmeister et al., "Evidential Grid-Based Tracking and Mapping", IEEE Transactions on Intelligent Transportation Systems, Jun. 2017, pp. 1454-1467, vol. 18 No. 6.

Dominik Nuss et al., "Fusion of Laser and Radar Sensor Data with a Sequential Monte Carlo Bayesian Occupancy Filter", IEEE Intelligent Vehicles Symposium (IV), Jun. 28-Jul. 1, 2015, pp. 1074-1081, Seoul, Korea.

* cited by examiner

PERCEPTION DEVICE

TECHNICAL FIELD

Various aspects of this disclosure relate generally to a vehicle perception device and perception method.

BACKGROUND

Perception and sensor fusion are important processes of fully or partially Automatic Driving vehicles. They can be considered the eyes and ears of vehicles with some level of automation. The quality of their output sets a boundary on the quality and safety that the subsequent behaviors such as route planning and driving components can achieve.

Initial approaches to solving the perception and sensor fusion problem were based on detecting and tracking objects using a bounding box approach; but the bounding box approach fails to take into account large objects, such as buildings for which no bounding box can be constructed; in addition, the bounding box approach is computationally very expensive. Particle filters in conjunction with Dynamic Occupancy Grids (DOG) address some of the problems of the bounding box technology: particle filters and DOG model the space around the vehicle with a grid, sensor measurements are transformed in particles that are placed on the grid and then abstracted to recognize object boundaries and road obstacles. As a result, static and dynamic objects can be represented simultaneously independently of their size, overcoming some of the limitations of the bounding box technology.

Particle filters and Dynamic Occupancy Grids are effective at detecting both dynamic objects, such as other moving vehicles, and static objects, such as large buildings, but they still suffer from a high computational cost. Specifically, Particle filters require the use of a large number of particles on the Dynamic Occupancy Grids; since particles have to be tracked individually to monitor the development of the space around the vehicle, the computational cost of particle filters increases with the number of particles. Furthermore, factors such as vehicles speed may further increase the number of particles that need to be tracked.

In realistic systems, the use of particle filters forces a trade-off between the precision of the description of the environment, which improves with an increase in the number of particles, and response time which improves with a decrease in the number of particles.

SUMMARY

Herein is disclosed a perception device including a receiver configured to receive sensor information including information about a location and a velocity of one or more objects detected by a sensor; a memory configured to store an occupancy grid of a predetermined region, wherein the occupancy grid includes a plurality of grid cells, wherein each grid cell represents an area in the predetermined region, wherein at least one grid cell of the plurality of grid cells is associated with a respective single occupancy hypothesis; a single occupancy hypothesis determiner configured to determine a single occupancy hypothesis; wherein the single occupancy hypothesis includes information about a degree of belief of occupancy of the grid cell depending on the sensor information and velocity of the grid cell depending on the sensor information; wherein a contribution of a sensor information value to the degree of belief of occupancy substantially decreases with an increase of a distance of the location of the object detected by the sensor from a center of the grid cell; and wherein the velocity of the grid cell is dependent on a velocity of one or more objects.

BRIEF DESCRIPTION OF THE DRAWINGS

In the drawings, like reference characters generally refer to the same parts throughout the different views. The drawings are not necessarily to scale; emphasis is instead generally being placed upon illustrating the principles of the disclosure. In the following description, various embodiments of the disclosure are described with reference to the following drawings, in which.

DESCRIPTION

The following detailed description refers to the accompanying drawings that show, by way of illustration, specific details and embodiments in which the disclosure may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any embodiment or design described herein as "exemplary" is not necessarily to be construed as preferred or advantageous over other embodiments or designs. The word "likelihood" is used herein to mean a measure of possibility; likelihoods may be expressed in term of probabilities, likelihood may also be referred to as belief, and it may also be referred to as of plausibility, and it may also be referred to through other mathematical functions that may express a degree of possibility or uncertainty.

Whereas the description, the examples and the figures refer to an Automatic Driving (AD) vehicle, it should be understood that the perception device disclosed as well as the examples disclosed in general may be used in a wide range of applications including security cameras that may use the object tracking device to monitor access to a given area, traffic lights that may use object tracking device to monitor the traffic waiting at an intersection, smart digital signage for both advertisement and information purposes that may use tracking device to estimate the number of impressions or to derive the most relevant content to display, traffic congestion sensors that may use the object tracking device to estimate the traffic in a given area, speedometers that may use the object tracking device to compute the speed of vehicles in a given area.

Figure 1:
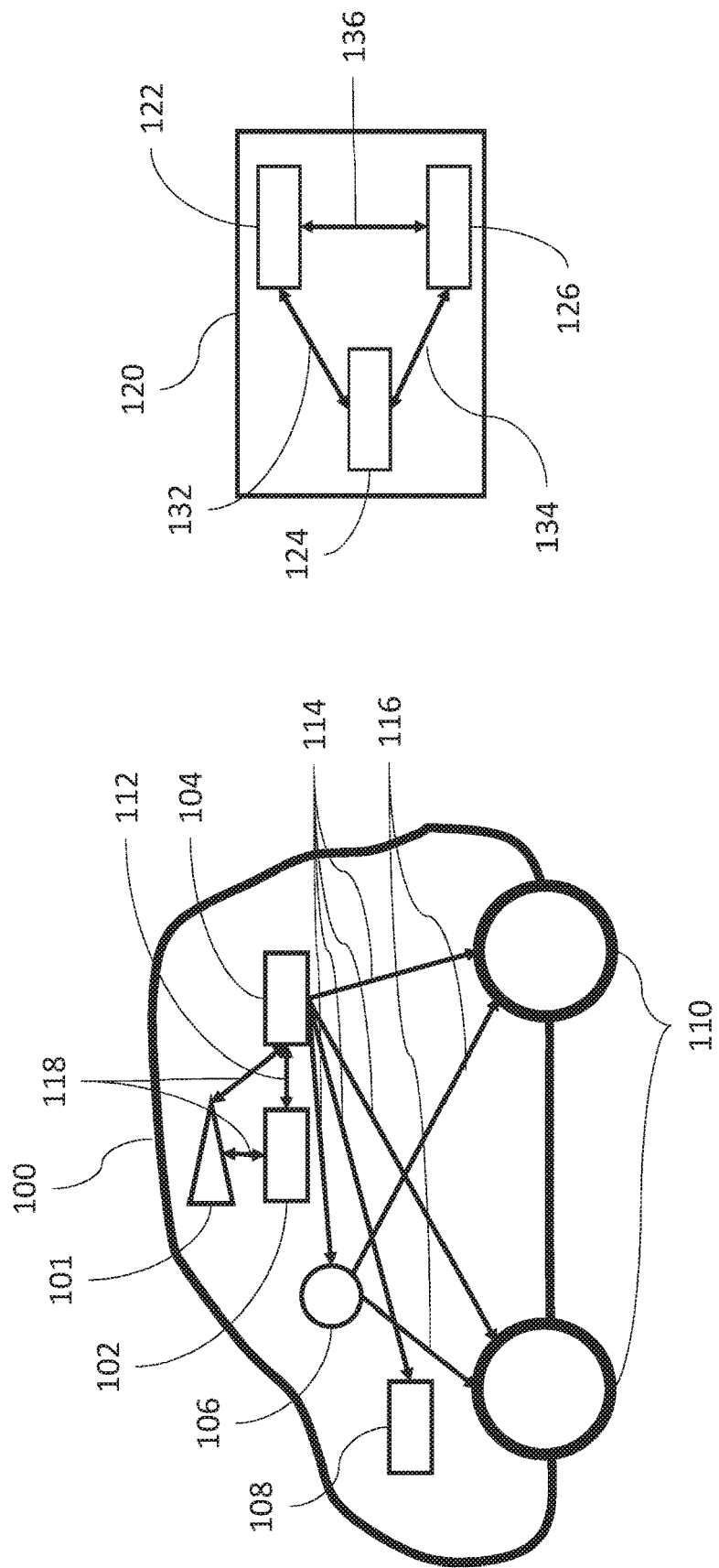
FIG. 1 shows an exemplary vehicle (e.g. an automatic vehicle) containing a perception device, and a diagram showing the components of an exemplary perception device.

FIG. 1 shows an exemplary vehicle (e.g. an automatic vehicle) 100 that contains a perception device, and a diagram showing the components 122, 124, 126 of an exemplary perception device 120. The description of the vehicle 100 below is limited to the components that are relevant to this description. It should be understood that the exemplary vehicle 100 may include various other components which are not described.

The exemplary vehicle 100 includes a sensor module 101, a perception device, to process sensor information to detect objects, in other words obstacles, on the path of the vehicle, 102, an automotive controller 104 of the vehicle 100, as well as various automotive components such as a steering module 106, a motor 108, and wheels 110 which may also include a braking system and a turning system neither of which are displayed.

The exemplary vehicle 100 may be driving on a road populated by a plurality of vehicles. In the disclosure below, a distinction may be made between vehicle 100, also indicated as the ego vehicle, and other vehicles. From the point of view of the ego vehicle, other vehicles are moving objects to be avoided; therefore, the task of the ego vehicle 100 is to track the other vehicles and to predict their position in time.

The vehicle 100 may be an automatic driving car, an automatic drone, an automatic plane or any other flying object, an automatic bike, trike, or the like. As an alternative, the automatic vehicle 100 may be any kind of robot or moving hardware agent. It is to be noted that the vehicle 100 does not necessarily need to be a fully automatic vehicle, but can also be a partially automatic vehicle or a vehicle which implements the perception device as part of the driver assistance systems. Furthermore, the disclosure below may be relevant for any device requiring perception in a given area, such as surveillance devices which may monitor a specific location. As opposed to vehicles that constantly change position, such devices may be fixed in a specific position.

In one embodiment of vehicle 100 displayed in FIG. 1, the sensor module 101, the perception device, 102, and the automotive controller 104 are displayed as three distinct components. It should be understood that in some embodiments of vehicle 100 the three components 101, 102, and 104 may be integrated in different ways. For example, in some embodiments the sensors 101 and the perception device 102 may be integrated in a single perception module; in other embodiments the perception device 102 may be integrated in the automotive controller 104; in yet other embodiments both the sensors 101 and the perception device 102 may be integrated in the automotive controller 104. In other embodiments, all other forms of integration may be adopted.

The sensors module 101 may include a plurality of sensors such as mono-camera, Lidar sensor, Radar sensors, as well as positioning sensors that may be implemented in relation to satellite-based positioning systems such as GPS, Galileo, GLONASS, Beidou or variants of these systems such as the Differential GPS, or other types of positioning systems such as positioning systems based on Cellular technology, or other types of technologies. The sensors module may also include sensors of the movement of the vehicle such as odometry sensors including one or more Inertial Measurement Units (IMU) which may include sensors such as accelerometers, gyroscopes, and magnetometers, as well as visual odometry sensors. The sensor module may include a range of additional sensors monitoring the correct functioning of the vehicle, as well as other sensors that may be required by the vehicle. Although the sensor module is shown in FIG. 1 as a single component, it should be understood that the sensor module may be highly distributed within the vehicle, with sensors being placed in positions that maximize their effectiveness.

The exemplary perception device 120 may be functionally similar to the exemplary perception device 102. The perception device 120 may include a receiver of sensor information 124 configured to receive information about road occupancy, such as the location of objects on the road, their velocity and other types of information that may be detected by sensors. A memory 122 storing one or more occupancy grids, of a predetermined region, wherein each occupancy grid may include a plurality of cells each of which stores a single occupancy hypothesis. One or a plurality of single occupancy hypothesis determiners 126 configured to determine a single occupancy hypothesis for the grid cells of the occupancy grids stored in the memory 122. The process of determining the single occupancy hypothesis includes the process of updating an already determined single occupancy hypothesis which may include additional sensor information. The process of determining the single occupancy hypothesis for the grid cells may be configured in such a way to require a Kalman filter to estimate the single occupancy hypothesis of all grid cells.

The connectors 132, 134, and 136 are connectors connecting the components 122, 124, and 126.

Each one of the occupancy grids stored in the memory 122 may represent the location of objects and obstacles in the predetermined region. Each grid cell that may be included in the occupancy grid may be associated with an area in the predetermined region; wherein each grid cell may be storing a single occupancy hypothesis that may include information about a degree of belief of occupancy of the grid cell depending on the sensor information and velocity of the grid cell also depending on the sensor information.

An exemplary information flow within component 120 may consist of component 124 receiving sensor information possibly from the sensor module. Upon receiving the sensor information, the receiver 124 may transmit the information to one or more single occupancy hypothesis determiners 126 through connector 134; the one or more single occupancy hypothesis determiners 126 determine the estimates of the single occupancy hypothesis of at least some of the grid cells of the grid by estimating the single occupancy hypothesis of those grid cells. The updated estimates may be transmitted to the memory 122 storing the occupancy grids through connector 136. Finally, the memory 122 stores the improved occupancy map.

The automotive controller 104 of the exemplary vehicle 100 may be configured to control the vehicle driving direction and speed, and in general to control the automotive components such as the steering module 106, the motor 108, and the wheels 110, the braking system and other systems that are included in the vehicle. The automotive controller may fully or partially control the vehicle. Full control may indicate that the automotive controller controls the behavior of all other automotive controllers, and the human driver is passive. Partial control may indicate that the automotive controller controls only some automotive components, but not others which are under control of the driver. For example, the automotive controller may be configured to control the speed, but not the steering of the vehicle and other components. Such automotive controller may exercise a level of control similar to a cruise control. In other cases, partial control may indicate that the automotive controller controls all automotive components, but only in some situations, for example, it may control the vehicle on the highway but not on other roads where the driver should take control; or that the automotive controller may control all the automotive components only in low traffic situations, while in high traffic the driver should take control.

FIG. 1 also shows an exemplary connection scheme across the different components. Such connections may be implemented as a wired connection or a wireless connection. Any kind of communication protocol including vehicle bus networks such as Controller Area Network (CAN), Local Interconnected Network (LIN) bus, FlexRay, Media Oriented System Transport (MOST), and Automotive Ethernet, as well as cryptographic and non-cryptographic variations, may be used for a communication between two respective components. Furthermore, the interaction between the components may be implemented as cyclic broadcast or multicast communication or a remote function call or an API call across software modules or in any other way that allows transfer of information between components.

The connection 112 between the perception device 102 and the automotive controller 104 may be configured to provide an exemplary information flow through which the perception device 102 communicates to the automotive module obstacle information possibly signaling whether there are objects or other vehicles ahead of the vehicle 100.

Each one of the connections 114 couples the automotive controller 104 with the other components, such as the steering module 106, the motor 108, and the wheels 110, and the like. The connections 114 may be configured to provide information flow from the various automotive components: e.g. the steering module 106, the motor 108, and the wheels 110 to the automotive controller 104.

The steering module 106 may communicate through 116 to a turning system (not shown) of the wheels 110 to change a respective wheel angle with respect to the direction of the vehicle 100 forcing the vehicle 100 to change direction. In some embodiments of vehicle 100, the steering module 106 may be configured to mechanically change the angle of the respective wheels 110 with respect to the direction of the vehicle 100 forcing the vehicle 100 to change direction. In other embodiments, the connectors 116 may be implemented as a communication connector. In other embodiments, the steering module 106 may be a component of a wheel's control system (not shown).

The connector 118 connects the sensor module to the perception device 102, and the automotive controller 104. Connector 118 may be used to transfer sensor information from the sensors to the perception device 102, and the automotive controller 104. Since the sensor module may be highly distributed within the vehicle, connector 118 may not be a single connector but a collection of connectors connecting each individual sensor to the components that need the sensor information. Although for exemplary reasons, connector 118 connects the sensors only to the perception device 102, and the automotive controller 104, it is to be understood that also other components of the vehicle 100 may require sensor information and therefore the connector 118 may, in reality, be more complex than shown in FIG. 1.

The components of the vehicle, and in particular the perception device may be realized by a non-transient computer readable medium storing a plurality of instructions implementing the methods required by those components. In the case of the perception device, the computer readable medium may store a plurality of instructions implementing a method for computing Kalman filter and method to compute the single occupancy hypothesis of all grid cells, including receiving, from one or more sensors, sensor information about a three-dimensional position of the vehicle; and applying a distributed Kalman filter to the sensor information to determine the position of the vehicle on the three-dimensional map.

The computer readable medium may include a plurality of processors and/or one or a plurality of controllers. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The computer readable medium may also be a virtualized device which is executed by one or more physical devices. In addition, the computer readable medium may be a network device residing in a cloud, or it may be configured to execute some functions in the cloud for example through remote API calls.

Figure 2:
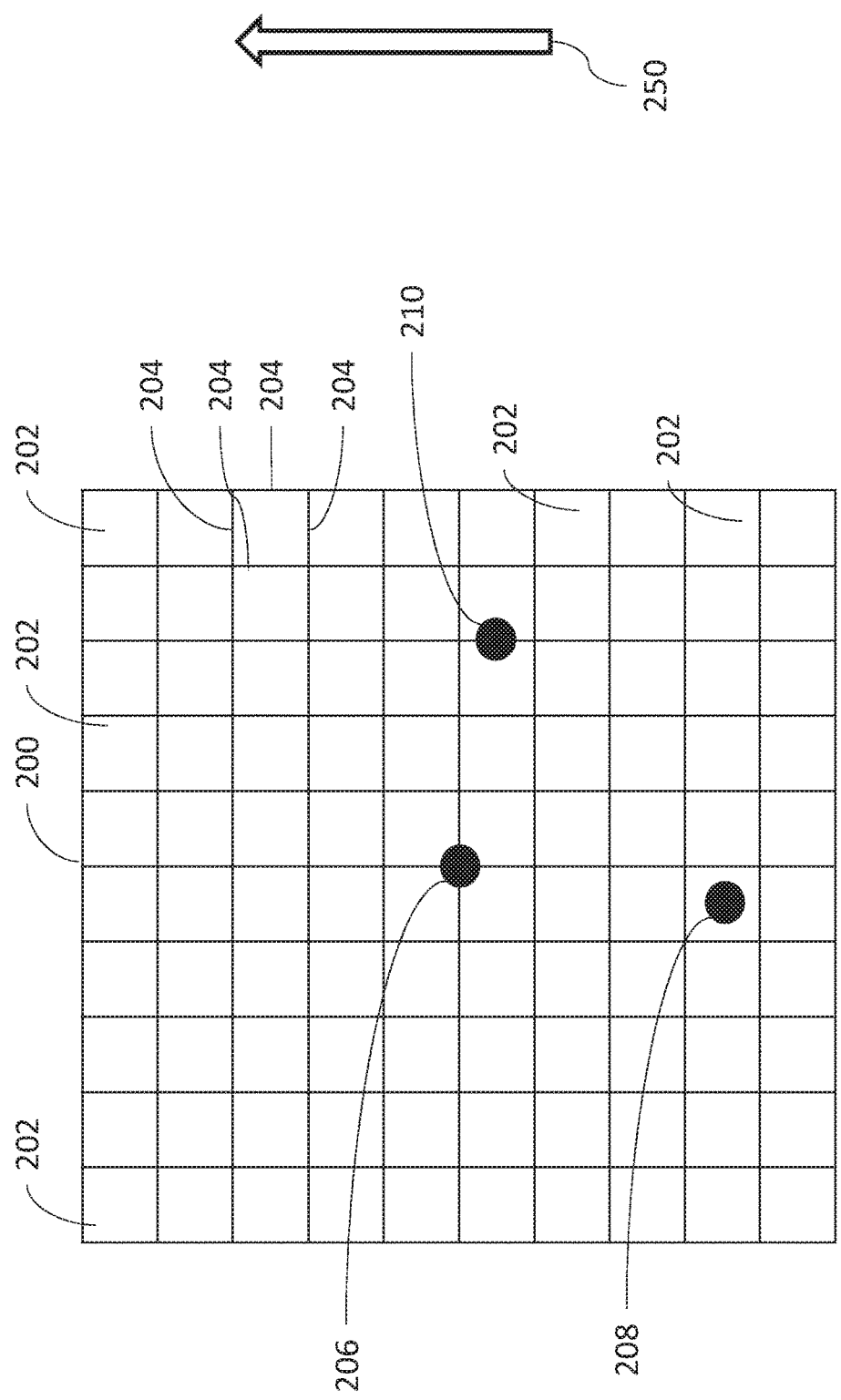
FIG. 2 shows an exemplary occupancy grid including a plurality of grid cells.

FIG. 2 shows an exemplary occupancy grid 200 including a plurality of grid cells 202. Each grid cell 202 is framed by respective grid cell frame lines 204. The point 206 may indicate the position of the ego vehicle 100.

The term "position of the ego vehicle" is used herein to mean "a point in the grid which represents the position of the ego vehicle". In some embodiments, the position of the ego vehicle may be established with respect to the center of the ego vehicle's rear axle, in other embodiments the position of the vehicle may be established with respect to the position of one of the sensors in the vehicle; in other embodiments, other positions may be chosen. Furthermore, the ego vehicle may occupy multiple grid cells in the occupancy grid depending on the size of the cells; the position of the ego vehicle may correspond to any one of those cells, or at the borders of some of those cells, or at the intersection of some of those cells, or a set of those cells, in yet other embodiments it may correspond to a different cell.

The points 208 and 210 may represent alternative possible positions of the ego vehicle 100. The grid 200 covers a space around the vehicle; also, the grid 200 moves with the vehicle to map the location of objects around the ego vehicle 100.

Each cell in the grid 200 is squared, but, in other embodiments, grid cells may be of other shapes such as rectangular, hexagonal and so on. Each grid cell covers a limited space around the ego vehicle. The size of a grid cell size may vary depending on the needs of the implementation and on other conditions.

In the grid embodiment 200, all grid cells are of the same size, but it should be understood that in other embodiments the size of grid cells may vary. For example, in some embodiments the grid cells may become smaller as they approach the ego vehicle, while they may become progressively larger as they approach the edge of the grid, wherein smaller grid cells may provide more precise information about the position of objects and obstacles on the road, while larger grid cells may provide course information. Furthermore, the grid cells size may vary depending on other conditions, such as speed of the ego vehicle, traffic conditions or others.

The arrow 250 may represent an exemplary direction of movement of the ego vehicle 100.

The grid 200 may move with the ego vehicle, therefore the area covered by the grid cells changes with time to match the movement of the ego vehicle.

The grid 200 may also move with respect to the ego vehicle. In some embodiments in which the ego vehicle needs equivalent information on all sides, the ego vehicle may be placed at or close to the center of grid 200, as shown by point 206. In other embodiments, the ego vehicle 100 may require more forward information with respect to the driving direction. In these embodiments, the ego vehicle may be placed in point 208 to provide more space on which to place information about the objects that are in front of the ego vehicle. The latter embodiment may be relevant when the vehicle is riding at high speed on a highway.

In other embodiments, the ego vehicle may require more information on the side. In these embodiments, the ego vehicle may be placed in point 210 closer to the side of the grid. These embodiments may be relevant when the ego vehicle is entering a busy road or changing lane on a highway with high traffic.

In other embodiments of grid 200. the ego vehicle may be placed in yet other positions in the grid; furthermore, in some embodiments of the grid 200, the position of the ego vehicle may be changed dynamically depending on conditions on the road or on the maneuvers that the ego vehicle is trying to accomplish.

In FIG. 2, the vehicle may move with respect to the occupancy grid, but in general the frame of reference of the occupancy grid may also move with respect to the vehicle. In some embodiments, that frame of reference of the occupancy grid may be based on the position of the vehicle, in other embodiments, the grid frame of reference may be placed with respect to one of the sensors; in yet other embodiments, such frame of reference may be placed completely outside the ego vehicle.

Grid 200 is shown as a squared grid of adjacent grid cells. It should be understood that this may not always be the case. In some embodiments, the grid may have other forms. By way of example, when the perception device is applied to a traffic light, the grid may have a cross form to concentrate exclusively on the crossing roads regulated by the traffic light. In some embodiments, the grid may be composed of a plurality of different grids. In other embodiments, the grid cells may not be adjacent but separated one from the other.

Figure 3:
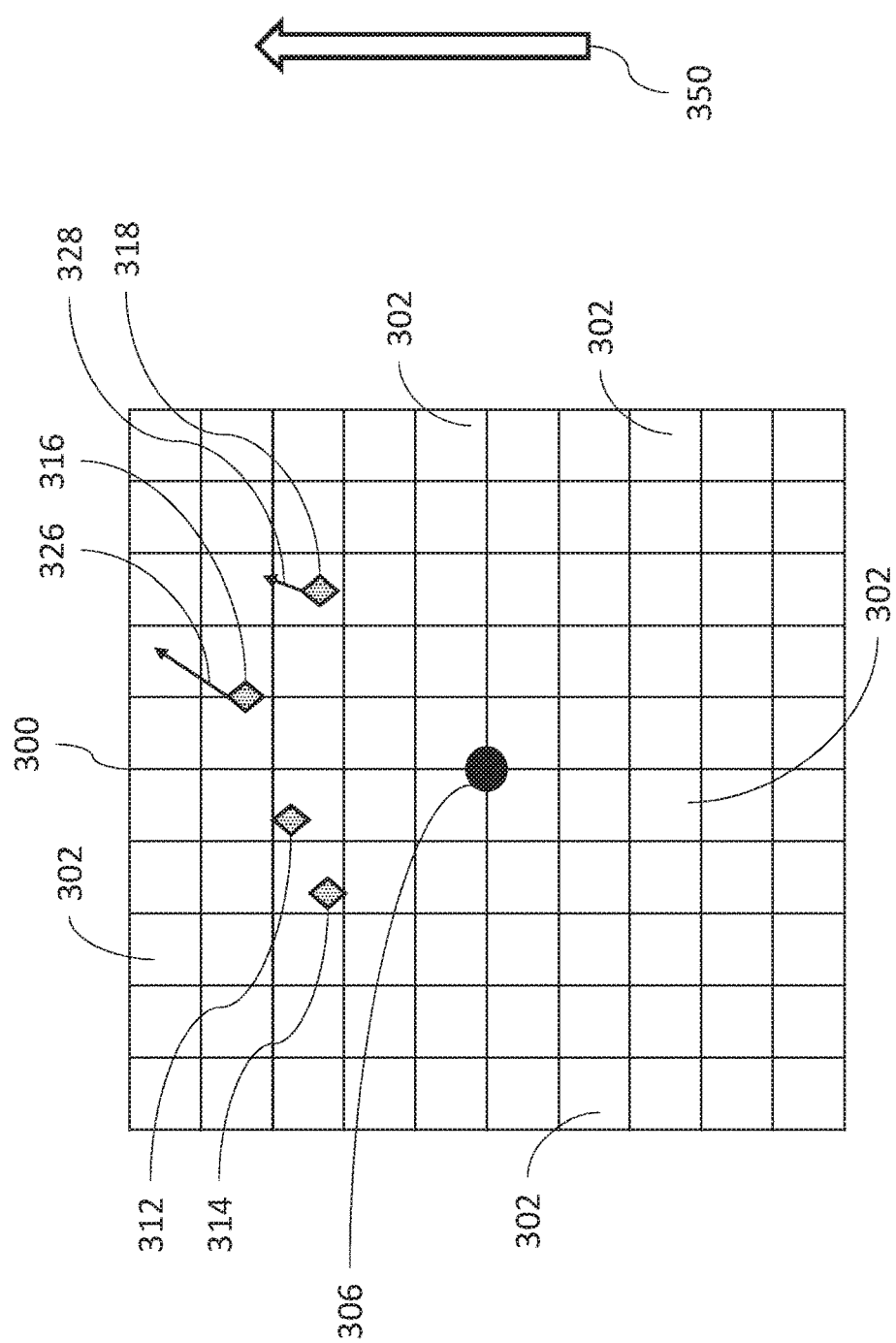
FIG. 3 shows an exemplary occupancy grid including a plurality of grid cells and a plurality of sensor measurements projected on the grid.

FIG. 3 shows an exemplary occupancy grid 300 including a plurality of grid cells 302 and a plurality of sensor measurements whose projection is represented by the diamonds 312, 314, 316, and 318. The point 306 may indicate the position of the ego vehicle 100. The arrow 350 may indicate the direction of movement of the ego vehicle.

In some embodiments, the sensor measurements 312, 314, 316, and 318 may be projections on the grid of the measurement of Lidar or Radar reflections; in other embodiments, they may be projections of visual features extracted from camera pictures; in other embodiments, they may be projections of other sensors information, wherein, the projection of a sensor measurement on the occupancy grid is the location in the occupancy grid to which the sensor measurement refers to. For example, if a sensor measurement indicates the presence of an object at a given distance in front of the vehicle, the position of that object in the occupancy grid corresponds to the projection of the sensor measurement in the occupancy grid.

Some embodiments of sensor measurements may refer to static objects that do not move in space such as buildings, trees, parked vehicles and others. In other embodiments, sensor measurements may refer to dynamic objects that change position in time. Dynamic objects may include vehicles driving on the road, pedestrian crossing the road or walking along the road, animals and other moving entities or objects.

Some embodiments of sensor measurements may be associated with the velocity information of the corresponding objects, wherein velocity information may consist of the direction of movement of the object and an amount indicating the speed of the detected object. By way of example, the measurements 316 is associated with a velocity information illustratively represented by the arrow 326 where the direction of the arrow represents the direction of movement a first exemplary object (not shown); and the length of the arrow is proportional to the speed of the first exemplary object. Similarly, the sensor measurement 318 is associated with an arrow 328 representing the velocity of a second exemplary object (not shown) in the environment. The difference of length of the arrows 326 and 328 illustratively shows that the first exemplary object detected by the sensor measurement 316 moves at a higher speed than the second exemplary object detected by sensor measurement 318; the directions of the arrows 326 and 328 show that the two objects move approximately in the same direction.

Sensor measurements associated with velocity information, such as sensor measurements 316 and 318, may indicate the presence of dynamic objects. Sensor measurements that are not associated with velocity information, such as sensor measurements 312 and 314, may indicate the presence of static objects, or they may be measurements from a sensor that cannot detect velocity information.

In some embodiments, the velocity information associated with sensor measurements may be absolute in the sense that it is measured independently of the velocity of movement of the ego vehicle. In other embodiments, the velocity information associated with sensor measurements may be relative to the velocity of the ego vehicle.

Figure 4:
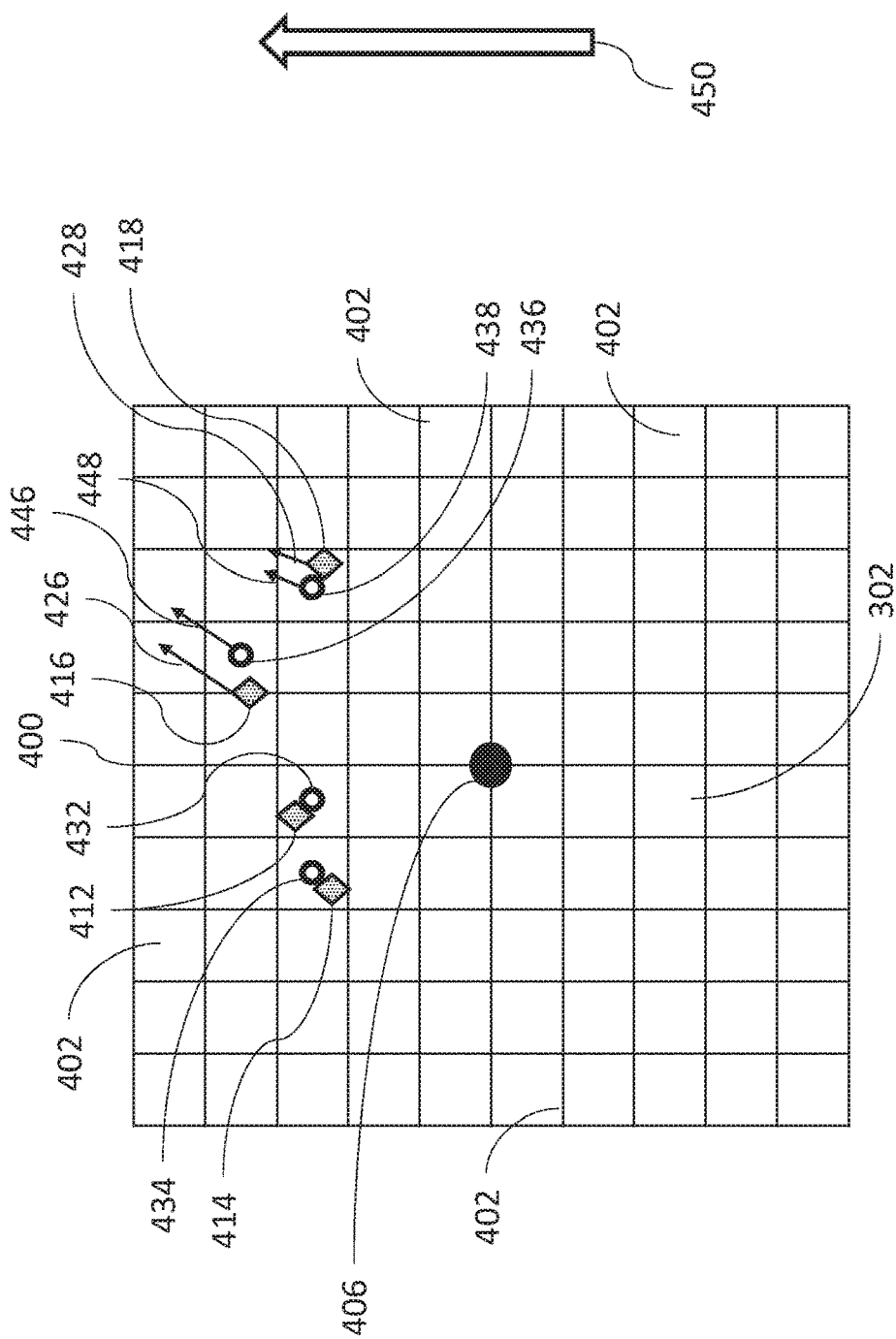
FIG. 4 shows an exemplary occupancy grid including a plurality of grid cells, a plurality of sensor measurements and a plurality of single occupancy hypothesis.

FIG. 4 shows an exemplary occupancy grid 400 including a plurality of grid cells, some of which are indicated as grid cell 402, a plurality of sensor measurements represented by the diamonds 412, 414, 416, 418, and a plurality of single occupancy hypotheses represented by the circles 432, 434, 436, 438. The point 406 may indicate the position of the ego vehicle 100. The arrow 450 may represent the direction of movement of the ego vehicle.

The occupancy grid, 400 through the single occupancy hypotheses 432, 434, 436, 438, indicates which grid cells may be occupied and which grid cells may be free; wherein grid cells without any sensor measurement may be assumed to correspond to areas free of obstacles.

A single occupancy hypothesis provides the occupancy information of grid cells. As such a single occupancy hypothesis a hypothetical grid cell $C_i$ may be defined by a tuple $$<b_i, v_{x,i}, v_{y,i}> \qquad (1)$$

wherein:
- $b_i$ is the degree of belief of occupancy of the grid cell, $C_i$ in other words, a measure of the likelihood that the grid cell is occupied;
- $v_{x,i}$ is the velocity of the grid cell $C_i$ in the X direction;
- $v_{y,i}$ is the velocity of the grid cell $C_i$ in the Y direction;

wherein the velocity of the grid cells may indicate the velocity of the objects that have been detected in the grid cell.

By way of example, each static grid cells may be characterized by a single occupancy hypothesis in which $b_i$ is high, representing a high likelihood of occupancy, while $v_{x,i}$ and $v_{y,i}$ is 0 or very low indicating lack of movement. On the other hand, dynamic grid cells may have a high value for $b_i$, indicating that the grid cell is likely to be occupied, and a high value for $v_{x,i}$ and $v_{y,i}$ indicating movement. Occupancy hypotheses may be also associated with free cells, in other words with cells that are considered to be free of objects or obstacles. Such occupancy hypotheses may be characterized by a belief of occupancy $b_i$ of the grid cell, $C_i$ that are low or 0 and irrelevant velocity values since the absence of objects results in absence of movement.

The calculation of a single occupancy hypothesis and specifically of $b_i$ $v_{x,i}$ and $v_{y,i}$ may depend on the values collected by the sensors in the sensor module 101, since sensor measurements provide evidence of the existence of objects in the environment of the ego vehicle 100.

The degree of belief that the grid cell $C_i$ is occupied may be computed by the belief function in the following formula (2)

$$m_s^i(\{S,D\}) = \max_j \left( m_{occ} * e^{-\frac{(x^i - z_t^j)^2}{2*\sigma^2}} \right) \quad (2)$$

wherein:
- $\{S, D\}$ is the type of occupancy of the grid cell wherein:
  - S indicates static occupancy;
  - D indicates dynamic occupancy;
- $m_{occ}$ is the maximum evidence for occupied; it is constant in the range [0:1];
- i is the grid cells index;
- j is the sensor readings index;
- t is a time reading index;

$$e^{-\frac{(x^i - z_t^j)^2}{2\sigma^2}}$$

is a Gaussian function wherein:
- $x^i$ is the center of the i-th grid cell;
- $z_t^j$ is the position of the j-th sensor reading at time t;
- $\sigma$ is a parameter determining the slope of the Gaussian.

In formula (2). the Gaussian function acts as a discount factor whereby the measurements $z_t^j$ that are further from $x^i$ provide a reduced contribution to the occupancy of grid cell i; furthermore the use of the $\max_j$ function selects the sensor j measurement that contributes the most to a grid cell, removing the contribution of all the others. Finally, it should be observed that formula (2) returns values that are included between 0 and 1. In other words, the contribution of a sensor information value to the degree of belief of occupancy of the grid cell i substantially decreases with an increase of a distance of the location of the object detected by the sensor from $x^i$.

In some embodiments, the value $\sigma$ in formula (2) may be related to the standard deviation of the values of x with respect to z. In such cases. $m_s^i(\{S,D\})$ may have mathematical properties of the probabilistic normal distribution.

Figure 5:
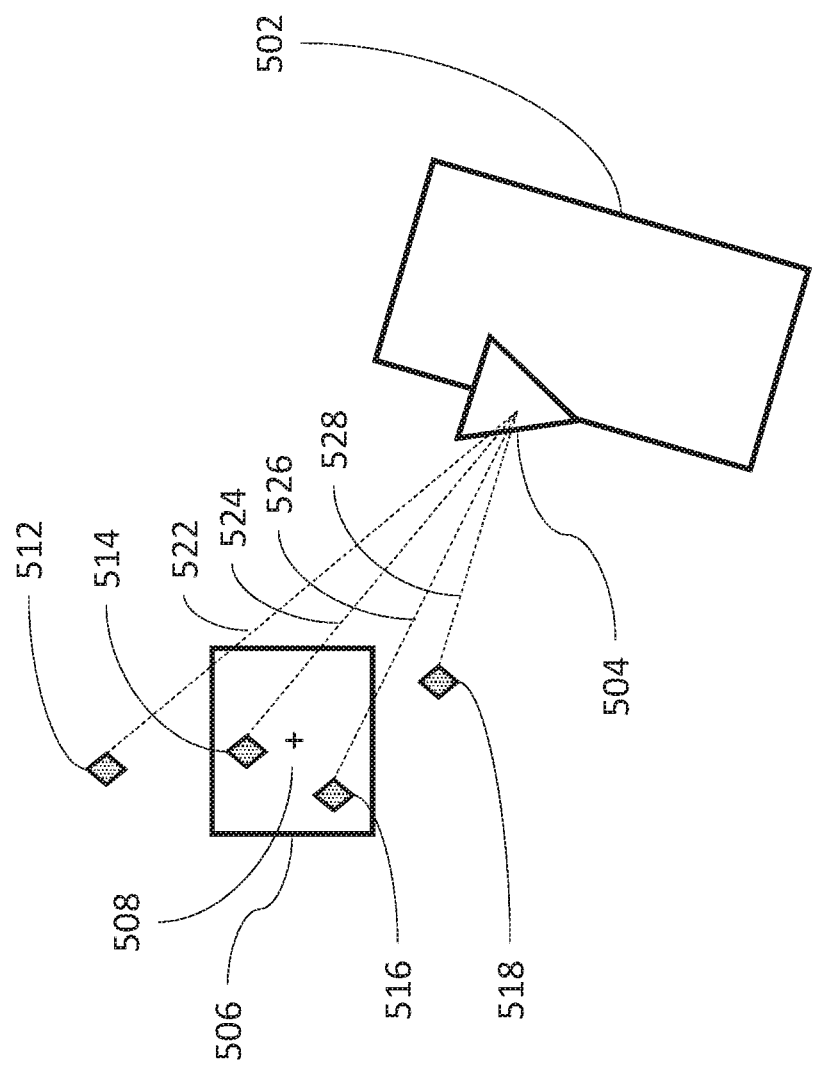
FIG. 5 shows the measurement bearers of sensor measurements that may be relevant to compute the occupancy of a given grid cell.

FIG. 5 shows the measurement bearers 522, 524, 526, 528 of sensor measurements 512, 514, 516, 518 that may be relevant to compute the occupancy of a given grid cell 506. In FIG. 5, the rectangle 502 represents a vehicle, by way of example, vehicle 100; and the triangle 504 represents the sensor module of vehicle 502. The square 506 represents a grid cell, whose center is indicated by the cross 508. The diamonds 512, 514, 516, and 518 represent sensor measurements. The lines 522, 524, 526, 528 represent the measurement bearers of the sensor measurements 512, 514, 516, and 518, wherein the measurement bearers are the direct line from the sensor to the projection of the measurements.

In FIG. 5, the measurements bearers 522, 524, 526, corresponding to the measurements 512, 514, 516, cross at least one boundary of the grid cell 506, therefore the measurements 512, 514, 516 may be regarded as relevant in the evaluation of the belief of grid cell 506; on the opposite the measurement 518, whose direct line does not cross the boundaries of grid cell 506 may be ignored in the evaluation of the belief of grid cell 506. Nevertheless, the measurement 518 may be considered as relevant for other grid cells that are not displayed.

Note that the bearers' lines 522, 524, 526, 528 are exemplary. Real sensors may result in a conic shape rather than a straight line. In some embodiments, an estimate of the most likely position of the middle line of the beam may be used to estimate the position of the straight lines.

Figure 6:
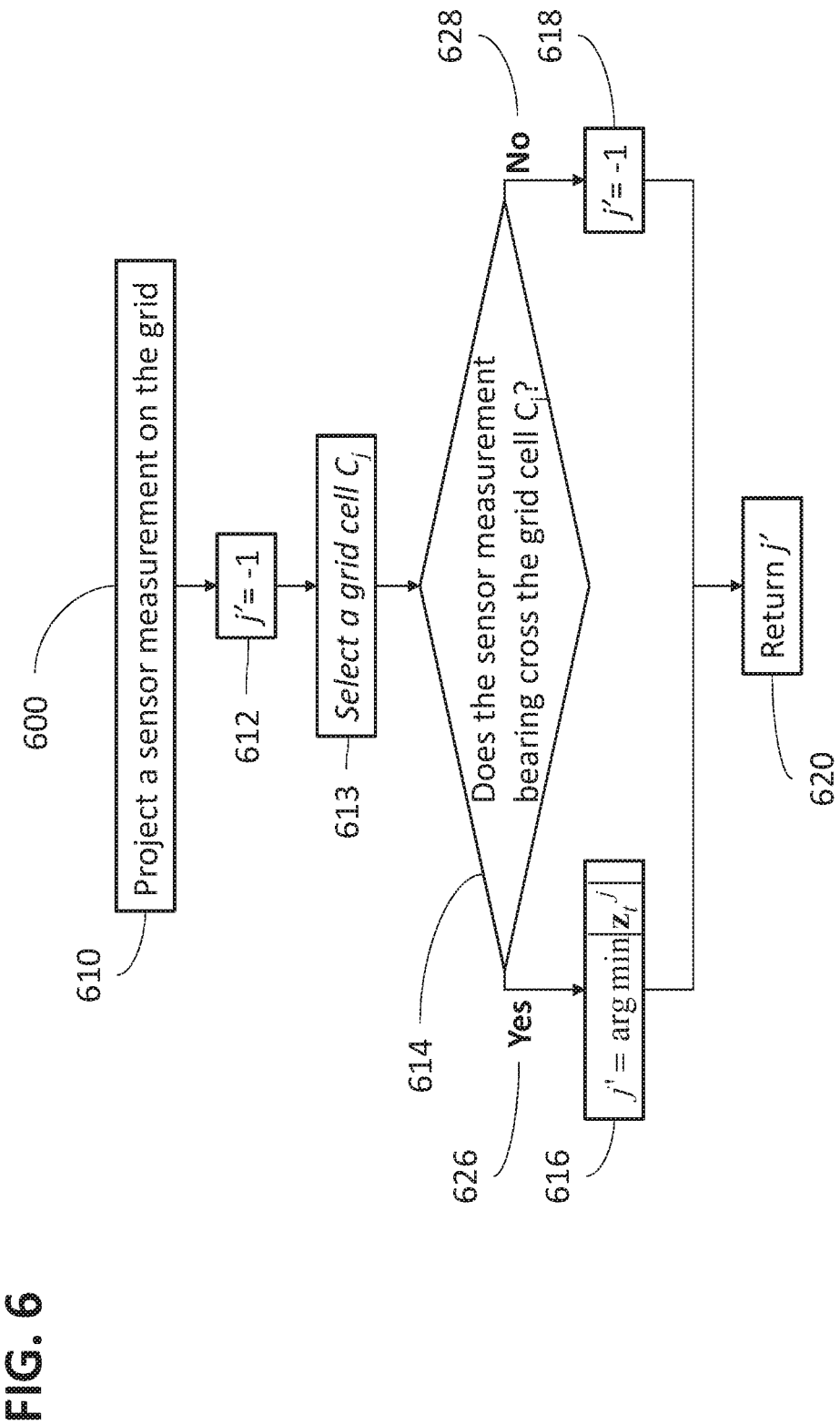
FIG. 6 shows a flow diagram describing an algorithm to find the grid cells that are relevant for a given sensor measurement.

FIG. 6 shows a flow diagram 600 describing an algorithm to find the grid cells that are relevant for a given sensor measurement.

In 610. the sensor measurement is projected onto the occupancy grid. An example of such projection is the sensor measurement 512 in FIG. 5.

In 612. a variable j', associated with the sensor measurement, is created and assigned to the value 0.

In 613. a grid cell $C_j$ from the plurality of grid cells in the grid is selected.

Process 614, represented as a diamond, indicates a choice to be made; specifically, in 614 the sensor measurement bearing is analyzed to check whether or not the bearing crosses the boundaries of a given grid cell $C_j$. If the bearing crosses the boundary of grid cell $C_j$, the connector 626, labeled with "Yes" is followed leading to process 616 wherein the variable j' is assigned a value $$j' = \arg\min |z_t^j| \quad (3)$$

wherein:
- $z_t^j$ is a bearing passing through the current cell;
- j' is the smallest distance from the cell center to the bearing $z_t^j$ If instead in process 614 it is determined that the bearing does not cross the boundary of grid cell $C_j$, the connector 628 is followed leading to process 618 wherein the variable j' is assigned to −1. In process 620. the variable j' is returned.

In one example, the bearing 522 of sensor measurement 512 crosses the boundaries of cell 506, so the connector 626 out of process 614 may be followed leading to process 616 wherein j' is computed to be the smallest distance from the cell center to the bearing $z_t^j$.

In a different example, the bearing 528 of sensor measurement 518 does not cross the boundaries of cell 506, so the connector 628 out of process 614 may be followed leading to process 618 wherein j' may be assigned the value −1.

It should be understood that the description of process 614 is just exemplary, in some embodiments process 614 may just return a positive value such as 1, while in other embodiments other functions that may lead to a positive value may be used.

In practical implementations, the algorithm processes in the block diagram 600 may be executed exclusively for cells for which a measurement has been detected. Empty cells or cells for which no measurement has been detected may be ignored.

Given the algorithm 600, formula (2) may be re-formulated as formula (4) below.

$$m_S^i(\{S,D\}) = \begin{cases} \max_j \left( m_{occ_j} e^{-\frac{(x^i - z_i^j)^2}{2\sigma^2}} \right) & \text{if } j' > 0 \\ 0 & \text{else} \end{cases} \quad (4)$$

wherein:
{S, D} is the type of occupancy of the grid cell wherein:
S indicates static occupancy;
D indicates dynamic occupancy;
$m_{occ}$ is the maximal occupancy value; it is a constant value in the range [0:1];
i is the grid cells index;
j is the sensor measurements index;
t is a time measurement index;

$$e^{-\frac{(x^i - z_i^j)^2}{2\sigma^2}}$$

is a Gaussian function wherein:
$x^i$ is the center of the i-th grid cell;
$z_t^j$ is the projection of the j-th sensor measurement at time t;
σ is a parameter determining the slope of the Gaussian function;
j' is a value that may be a positive value when the bearing of measurement $z_t^j$ crosses $x^i$ boundaries as described in formula (3), or it may be a negative value such as −1 otherwise.

Formula (4) states that a sensor measurement may contribute exclusively to the belief of occupancy of grid cells for which j'>0; all other grid cells may receive a value 0. In practical implementations, the value 0 may be ignored, when a cell has received no degree of belief of occupancy greater than 0, it may be assumed to be free.

In some embodiments, the algorithm described in the block diagram 600, every grid cell crossed by the bearing of a measurement may receive a value greater than 0. Some of these cells centers may be relatively far from the measurement projection resulting in negligible degrees of belief of occupancy. An example of this case may be seen in FIG. 5 wherein the projected sensor measurement 512 may contribute to grid cell 506 even though it may be quite distant from it, but, given formulae (2) to (4), such contribution may be negligible.

In practical implementations, a threshold may be used to remove extremely low occupancy values. All occupancy values that are below a given threshold may be automatically assigned to 0. In some embodiments of the perception device, such threshold may be based on a fix value, in other embodiments such threshold may be a function of the parameter σ.

Formulae (2) and (4) may provide a way to compute the degree of belief that a grid cell is occupied by either static or dynamic occupancy. Specifically, the degree of belief of occupancy $b_i$ of a grid cell $C_i$ may be assigned as shown in formula (5) below.

$$b_i = m_s^i(\{S,D\}) \quad (5)$$

wherein:
i is a grid cells index;
$m_s^i(\{S, D\})$ is the amount computed in formulae (2) or (4);
$b_i$ is the degree of belief of occupancy of the i-th grid cell.
A grid cell $C_i$ may be assumed to be free space when $b_i=0$ and i is the index of the grid cell.

It should be noted that in one embodiment the degree of belief of occupancy of cell $C_i$, $m_s^i(\{S, D\})$, may be interpreted as measure of likelihood that the cell $C_i$ is occupied; in other embodiments it may be interpreted as a mass belief of cell occupation, in other embodiments it may be interpreted as a posterior probability of occupation; in other embodiments it may be interpreted as a weight to assign to the presence of data in the cell.

The velocity of the grid cell may be derived from the velocity of the sensor measurement selected for the occupancy of the grid cell in formula (4). The derivation of velocity information from the sensors may be sensor specific because different sensors have very different ways to detect velocities with very different biases, and some sensors do not provide any velocity information at all. In some exemplary embodiments, the velocity may be set to $\vec{0}$.

In addition, in a single occupancy hypothesis which is related to a grid cell, as described above, the velocity needs to be described along the main coordinates systems.

Given that all the grid cells are associated with a single occupancy hypothesis containing belief of both occupancy and velocity information, the State Vector of the whole grid may be defined as the following:

$$\vec{X} = [v_{x,1}, v_{y,1}, b_1, \ldots, v_{x,i}, v_{y,i}, b_i, \ldots, v_{x,l}, v_{y,l}, b_l]^T \quad (6)$$

wherein:
$v_{x,1}$, $v_{y,1}$ correspond to the $1^{st}$ grid cell velocities;
$b_1$ corresponds to the $1^{st}$ grid cell the belief of occupancy;
$v_{x,i}$, $v_{y,i}$ correspond to the $i^{st}$ grid cell velocities;
$b_i$ corresponds to $i^{st}$ grid cell belief of occupancy;
$v_{x,l}$, $v_{y,l}$ correspond to the $l^{st}$ grid cell velocities,
$b_l$ corresponds to $l^{st}$ grid cell belief of occupancy,
wherein l is the number of grid cells in $\vec{X}$.

In formula (6), a single occupancy hypothesis for a grid cell i is represented by the three terms $v_{x,i}$, $v_{y,i}$, $b_i$. Since i ranges from 1 to the number of cells l, where l is the number of grid cells in the occupancy grid, each grid cell has its own occupancy hypothesis. Free grid cells may have a value for $b_i$ equal to 0, or any way equal to a very low value, to indicate that no object occupies the cell. The velocity of free cells is irrelevant since there is nothing moving in them.

Given the initial velocity derived from the sensors, single occupancy hypothesis determiner may compute how the velocity propagates with time. Therefore, it may assign a velocity to a cell, such as an exemplary Cell n. Furthermore, such velocity may depend on the propagation of the velocity from other cells, such as exemplary Cell m, that may be occupied by objects that in an exemplary next time point t+1 may occupy Cell n.

$$v_{t+1}(\text{Cell } n) = \sum_{m=1}^{l} b_n b_m v_t(\text{Cell } m) e^{-\frac{(v_t(\text{cell } m) - v_{gt}(\text{cell } m \rightarrow \text{cell } n))^2}{2\sigma^2}} \quad (7)$$

wherein
- l is the number of grid cells in the occupancy grid;
- m is an index ranging from 1 to l;
- $b_n$ is current grid cell degree of belief of occupancy of the grid cell n for which the velocity is computed;
- $b_m$ is the grid cell degree of belief of occupancy of grid cell m in the occupancy grid whose velocity may contribute to the velocity of grid cell n;
- $v_t$(Cell m) is the velocity at time t of grid cell m which may influence the velocity of grid cell n;
- $v_{t+1}$(Cell n) is the expected velocity of grid cell n at time t+1;
- $v_{gt}$(cell m→cell n) is a velocity that the objects in the grid cell m will need to hold to reach grid cell n at time t+1. Specifically, $v_{gt}$(cell m→cell n) may be defined as the following:

$$v_{gt}(\text{cell } m \rightarrow \text{cell } n) = \frac{\text{dist}(\text{cell } m \rightarrow \text{cell } n)}{dT} \quad (8)$$

wherein
- dist(cell m→cell n) is the distance from grid cell m to grid cell n;
- dT is defined as the time interval from time t to time t+1.

In Formula (7), the velocity $v_{gt}$(cell m→cell n), as defined in formula (8), represents the velocity that an object starting in the center of grid cell m at time t will have to hold to reach the center of grid cell n at time t+1. The Gaussian term in formula (7) therefore acts as a sort of a filter that tends to discard the velocity of all grid cells whose speed is substantially different than $v_{gt}$(cell m→cell n). The remaining terms $b_n b_m v_t$(Cell m) may be seen as calibration terms giving more weight to grid cells that have higher speed and a higher degree of belief of occupancy.

In other words, the contribution of a sensor reading to the velocity assigned to grid cell in formula (7) depend on the velocity of one or more objects that may not be in the grid cell n; furthermore, the contribution to the velocity of grid cell n by the objects detected in grid cell m may substantially decrease with an increase of the distance of the location that the objects could reach in the time span from t to t+1 from a center of the grid cell n.

Formula (8) is independent of any sensor measurements, rather it depends exclusively on the structure of the occupancy matrix. As a consequence, it may be pre-computed so that the computation of the amount $v_{gt}$(cell m→cell n) does not weight on the run time perception process.

Figure 7:
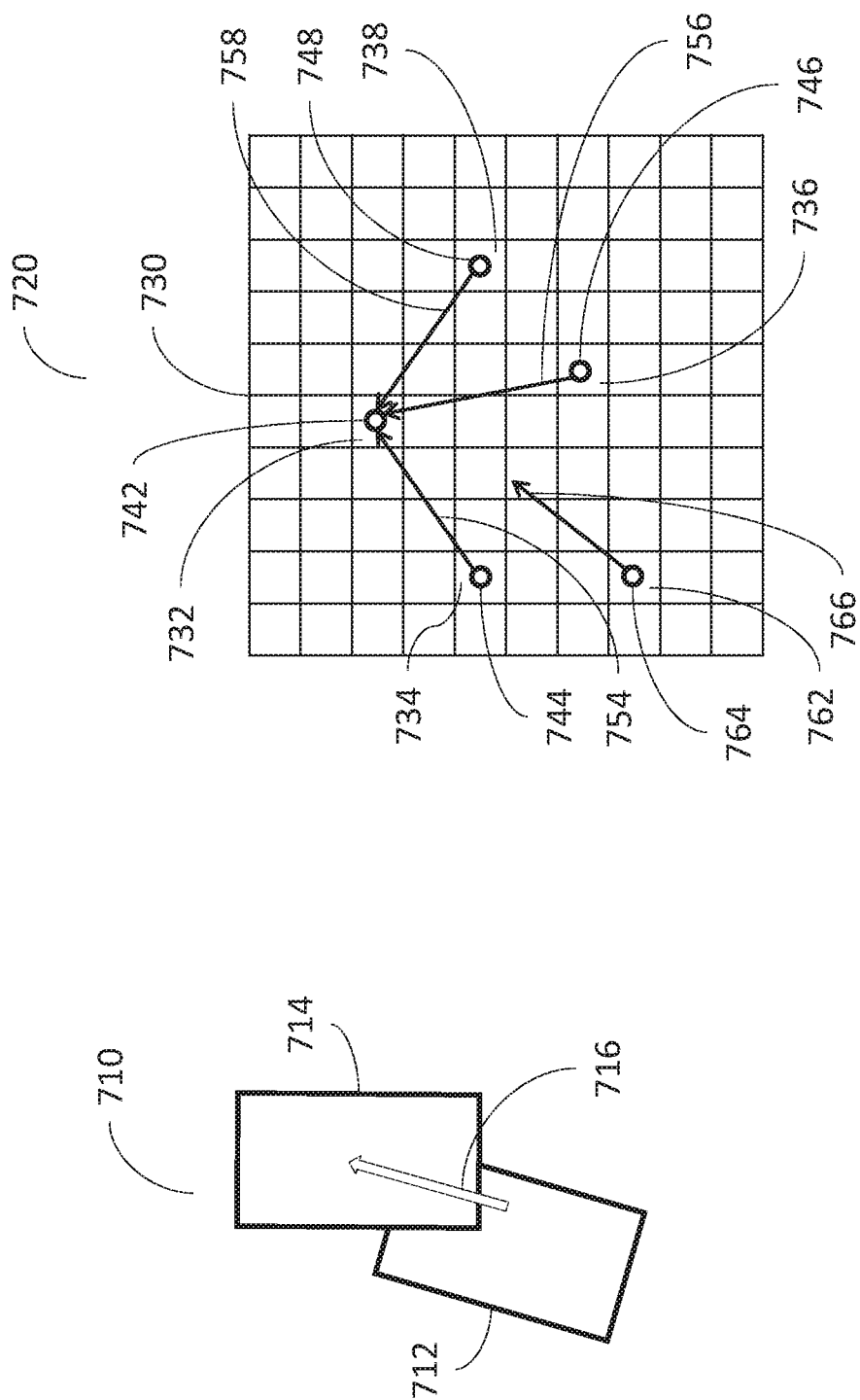
FIG. 7 shows an example of grid cells velocity propagation as vehicles and other objects move in the environment.

FIG. 7 shows an example of grid cells velocity propagation as vehicles and other objects move in the environment. In turn, FIG. 7 illustratively shows the rationale for formula (7).

In FIG. 7, diagram 710 represents the movement of a vehicle v. The rectangle 712 represents the vehicle v at a time t, while the rectangle 714 represents the vehicle v at a time t+1. The arrow 716 illustratively shows the velocity of the vehicle v at time t. Lacking any other information on the movements of the vehicle v, it may be assumed that the velocity of vehicle v will stay constant in the future.

In FIG. 7, diagram 720 represents the consequences of the assumption displayed in diagram 710 on the estimation of grid cells velocities. Diagram 720 represents an occupancy grid 730 in which the grid cell 732 corresponds to the grid cell n in formula (7), while grid cells 734, 736, 738 may represent three instances of grid cells m in formula (7).

The grid cell 732, which corresponds to Cell n in formula (7), has a single occupancy hypothesis, illustratively represented by the circle 742, with a degree of belief of occupancy $b_{732}$ and a velocity computed by the function $v_t$(Cell 732).

The grid cells 734, 736, 738 have a single occupancy hypothesis each indicated by the circles 744, 746, and 748, wherein the single occupancy hypotheses 744 has the degree of belief of occupancy $b_{734}$ and velocity $v_t$(Cell 734), the single occupancy hypotheses 746 has the degree of belief of occupancy $b_{736}$ and velocity $v_t$(Cell 736), and the single occupancy hypotheses 748 has the degree of belief of occupancy $b_{738}$ and velocity $v_t$(Cell 738), In the diagrams 720. the velocities of the occupancy hypotheses 744, 746, and 748 at time t are displayed as the arrows 754, 756, 758. They illustratively show that they will contribute to the degree of belief of occupancy and velocity of grid cell 732 at time t+1.

The computation of the predicted velocity of grid cell 732 at time t+1 should keep into account all these contributions. This is taken into account in formula (7) by weighing the velocities by the degrees of belief of the corresponding occupancy hypotheses and by a Gaussian distributed discount factor that effectively removes the contribution of grid cells whose velocity leads to grid cells other than 732.

In FIG. 7, the occupancy hypothesis 764 associated with the grid cell 762 provides an example of an occupancy hypothesis that, given its low contribution to the velocity of cell 732, tends to be filtered out by the Gaussian term in formula (7). In diagram 720, occupancy hypothesis 764 has a velocity 766. Although the velocity 766 may be in the direction of grid cell 732, the speed is also too low to reach grid cell 732, in the time frame from t to t+1. In the Gaussian term in formula (7), the difference $v_t$(cell 762)−$v_{gt}$(cell 762→cell 732) will be quite large and therefore that overall score of the Gaussian term will be small. Given such a small score, the contribution of the velocity of occupancy hypothesis 764 to the velocity of occupancy hypothesis 742 will be negligible. and it will tend to be filtered out.

Since the Gaussian term tends to filter out single occupancy hypotheses of cells m whose velocity may differ than $v_{gt}$(cell m→cell n), optimizations may be implemented whereby only the cells with a single occupancy hypothesis whose velocity $v_{gt}$(cell m→cell n) is greater of a given value may be considered further reducing the required computation at the cost of a negligible error.

Figure 8:
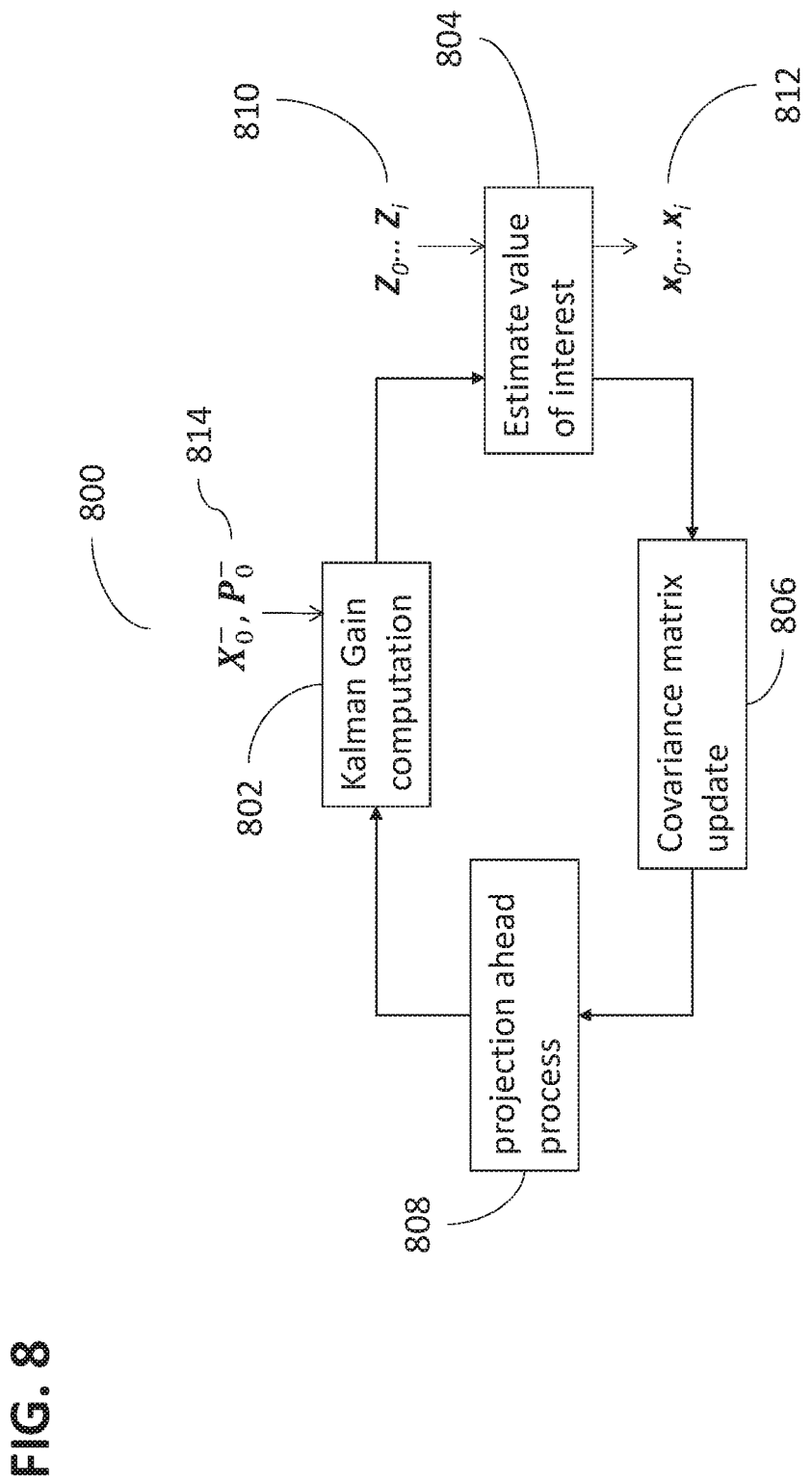
FIG. 8 shows an embodiment of the Kalman filter which may be used to update the occupancy grid keeping into account the sensor measurements.

FIG. 8 shows an embodiment 800 of the Kalman filter, which may be used by the single occupancy hypothesis determiner to update the occupancy grid keeping into account the sensor measurements.

In general, the Kalman filter 800 provides estimates of some unknown variables $X_t$, typically representing the internal state of a device, starting from repeated noisy sensor measurements $Z_t$ collected over time.

When the Kalman filter 800 is applied to the estimate of the occupancy grid, the unknown variables $X_t$ to be estimated is the updated occupancy grid, and the sensor measurements $Z_t$ is a vector of measurements provided by one or more of the sensors in the sensor module of the vehicle.

The core of the Kalman filter is to implement a feedback loop in which the estimate provided at a given iteration n is compared with the measurements performed at iteration n+1 to evaluate the error of the estimate. In turn, the error estimate is used to improve the derivation process and progressively reduce the error. As a consequence, the Kalman filter may progressively converge to predictions that progressively reduces the error of the projection to arrive at good estimates of the unknown variable $X_t$.

Since the Kalman filter is computed by an infinite feedback loop, there is no natural starting point and end point for the description of FIG. 8. The following description starts from process 804 wherein measurements 810 are transformed in an initial estimate 812, followed by the process 806 wherein the error is computed, followed by the process 808 wherein a new projection is provided, followed by process 802 wherein the Kalman gain is computed; with the completion of process 802, the feedback loop is closed by returning to process 804.

In 804, given some stochastically noisy measurements $Z_0$, $Z_i$, 810, collected during the iterations t=0 and t=1, produces some estimates 812 of values of interest $X_0$, $X_1$ corresponding to the values at iterations t=0 and t=1. The estimate is computed with the following formula:

$$\hat{X}_t = \hat{X}_t^- + K_t * (Z_t - h_t(\hat{X}_t^-)) \qquad (9)$$

wherein:
t is the index of the iterations;
$\hat{X}_t$ is the estimate of the variable of interest at iteration t;
$\hat{X}_t^-$ is the prior estimate of the variable of interest at iteration t;
$K_t$ is the Kalman gain;
$Z_t$ is the measurement at iteration t;
h is a function that may be non-linear.

In 806, an error covariance matrix $P_t$ for the updated estimate is computed. The error covariance matrix $P_t$ is computed with the following formula:

$$P_t = (I - K_t * H_t) * P_t^- \qquad (10)$$

wherein:
t is the index of the iterations;
$P_t$ is the error covariance matrix at the iteration t;
l is identity matrix;
$K_t$ is Kalman gains;
$H_t$ is the observational model at iteration t;
$P_t^-$ is the prior the error covariance matrix at the iteration t.

808 is a projection ahead process in which a new prior $\hat{X}_{t+1}^-$ of the variable in interest is computed and a new prior $P_{t+1}^-$ of the error covariance matrix is computed. The projection is computed with the following formulae:

$$\hat{X}_{t+1}^- = f(\hat{X}_t)$$

$$P_{t+1}^- = \varphi_t * P_t * \varphi_t^T + Q_t \qquad (11)$$

wherein:
$\hat{X}_{t+1}^-$ is the prior estimate of the variable of interest at iteration t+1;
$\hat{X}_t^-$ is the prior estimate of the variable of interest at iteration t;
f is a function relating measurements with state vector;
$\varphi_t$ is state transition matrix;
$P_{t+1}^-$ is the prior the error covariance matrix at the iteration t+1;
$P_t^-$ is the prior the error covariance matrix at the iteration t;
$Q_t$ is process covariance matrix.

In 802, the "Kalman gain" $K_t$ is computed, wherein the Kalman gain provides a measure of the trust in the measurements versus the trust in the estimation.

Process 802 is triggered using inputs 814, namely $\hat{X}_0^-$ which is an estimate of the prior of the vector $X_0$ and $P_0^-$ which are estimates of the covariance matrix $P_0$.

The Kalman gain in 802 is computed in accordance with the following formula:

$$K_t = P_t^- * H_t^T * (H_t * P_t^- * H_t^T + R_t)^{-1} \qquad (12)$$

wherein:
$K_t$ is the Kalman gain at iteration t;
$P_t^-$ is the prior the error covariance matrix at the iteration t;
$H_t^T$ is the translated matrix of the observational model at iteration t;
$H_t$ is the observational model at iteration t;
$R_t$ is measurement error covariance matrix.

In some presentations of the Kalman filter, the observational model may also be called measurement matrix.

The embodiment of the Kalman filter 800 may be any type of Kalman filter depending on the characteristics of the data provided, in some embodiments it may be an extended Kalman filter, in others it may be an Unscented Kalman filter, and in other embodiments it may be any one of the various variations on the Kalman filter.

Any embodiment of the Kalman filter, such as 800, may be configured to make a prediction on a given problem by providing the sensor measurements vector $Z_t$, the observational model H and the state transition matrix $\varphi$.

In some embodiments, the sensor measurements vector $Z_t$ may depend on the features of the sensors. Some sensors may provide only occupancy information; therefore $Z_t$ may be a sensor measurements vector with a structure equivalent to $Z = [b_1, b_2, \ldots, b_l]^T$ wherein each $b_k$ represents the estimate of occupancy of the k-th grid cell. Other sensors may also provide velocity information, therefore $Z_t$ may be a sensor measurements vector with a structure equivalent to $Z = [b_1, v_1, b_2, v_2, \ldots, b_l, v_l]^T$, wherein each $b_k$ represents the estimate of occupancy of the k-th grid cell, and each $v_k$ represents the velocity estimate for the k-th grid cell. In some embodiments, $v_k$ may be radial velocity. In other embodiments, $v_k$ may be a different type of velocity measurement. In other embodiments, $v_k$ may be separated in the main components with respect to some reference axis. Additional sensors information may be included in the vector Z or ignored.

In some embodiments, the estimates of occupancy in the vector Z may be expressed as probabilities, or probability distributions, of occupancy or as beliefs of occupancy. Similarly, the velocity estimates in the vector Z may be expressed as probabilities, or probability distributions of the velocity of the cell or as beliefs of the velocity of the cell.

In some embodiments, the observational model relates the prediction of the uncertainty in the measurements to the prediction uncertainty in the state. The observational model may be implemented as a matrix including l rows and 3*l columns wherein l is the number of grid cells in the occupancy grid. Furthermore, each row of the observational model matrix has the same structure as the State Vector. In some embodiments, each column with index i*3 with i ranging between 1 and N stores an indication of the belief of occupancy; each column with index i*3+1 with i ranging between 0 and N−1 stores velocity indication in the x-direction; each column with index i*3+2 with i ranging between 0 and N−1 stores velocity indication in the x-direction.

In some embodiments, the measurement matrix H may be configured as the measurement matrix (13) below.

$$H = \begin{pmatrix} 0 & 0 & 1 & 0 & & 0 & 0 \\ 0 & 0 & 0 & 0 & 0 & 1 & \\ \ldots & & & & \ldots & & \\ 0 & 0 & 0 & \ldots & & 0 & 0 & 1_l \end{pmatrix} \quad (13)$$

wherein each row represents one of the l grid cells, while the columns of the measurement matrix map the distribution of information in the State Vector described in formula (6).

In some embodiments of the Kalman filter 800, the state transition matrix φ may be defined by the following Jacobean matrix (13).

$$\varphi = \begin{bmatrix} \frac{\partial f_1}{\partial x_1} & \frac{\partial f_1}{\partial x_2} & \cdots & \frac{\partial f_1}{\partial x_{3l}} \\ \cdots & \cdots & \cdots & \cdots \\ \frac{\partial f_{3l}}{\partial x_1} & \frac{\partial f_{3l}}{\partial x_2} & \cdots & \frac{\partial f_{3l}}{\partial x_{3l}} \end{bmatrix} \quad (14)$$

wherein:
φ is a matrix with 3l rows and 3l columns;
f is a function;
l is the total number of cells, and X=f(X).

The table (14) is a Jacobean matrix; the elements of the matrix (14) provide the possibility to calculate the changes of the state vector based on the current state vector in a linearized way.

In one embodiment, the elements of the Jacobean matrix (14) may be replaced by partial derivatives of formula (7) to compute the velocity of cells, such as an exemplary Cell n, in the occupancy grid. The exemplary formulae (15) to (18) below provide an indication of how velocity may be used in an embodiment of the Jacobian matrix (14).

$$\frac{\partial \dot{v}_{x_{t+1}}(\text{Cell } n)}{\partial b_n} = \sum_{m=1}^{l} b_m v_{x_t}(\text{Cell } m) e^{-\frac{(v_t(\text{cell } m) - v_{gt}(\text{cell } m \to \text{cell } n))^2}{2\sigma^2}} \quad (15)$$

$$\frac{\partial \dot{v}_{x_{t+1}}(\text{Cell } n)}{\partial b_m} = b_m v_{x_t}(\text{Cell } m) e^{-\frac{(v_t(\text{cell } m) - v_{gt}(\text{cell } m \to \text{cell } n))^2}{2\sigma^2}} \quad (16)$$

$$\frac{\partial \dot{v}_{x_{t+1}}(\text{Cell } n)}{\partial v_x(\text{Cell } n)} = -1 \quad (17)$$

$$\frac{\partial \dot{v}_{x_{t+1}}(\text{Cell } n)}{\partial x(\text{Cell } m)} = b_n b_m e^{-\frac{(v - v_{gt})^2}{2\sigma^2}} \left(1 - \frac{v_x(v_x - v_{gtx})}{\sigma^2}\right) \quad (18)$$

wherein:
l is the total number of all grid cells;
m is an index ranging from 1 to l, or in other words ranging across all grid cells;
Cell n and Cell m are references to specific grid cells;
$b_n$ is a current degree of belief of occupancy of a grid cell n for which the velocity change is computed;
$b_m$ is the degree of belief of occupancy of any grid cell in the occupancy grid whose velocity may contribute to the velocity of grid cell n;
$v_t$(Cell m) is the velocity at time t of grid cell m which may influence the velocity of grid cell n;
$v_{t+1}$(Cell n) is the expected velocity of grid cell n at time t+1;
$v_{gt}$(cell m→cell n) is a velocity that the objects in the grid cell m will need to hold to reach grid cell n at time t+1 as defined in formula (8).

Figure 9:
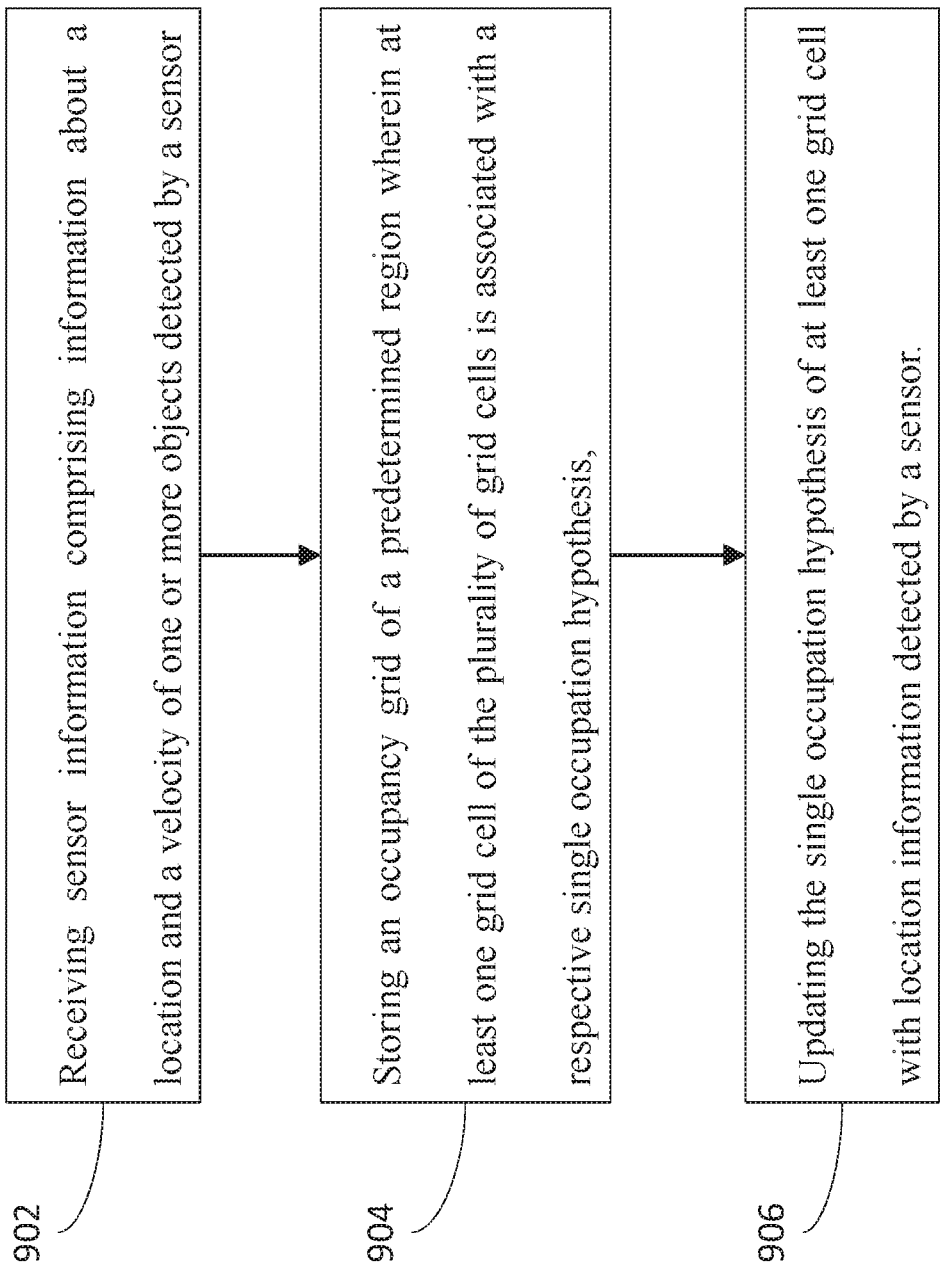
FIG. 9 shows an overview of the process of updating the occupancy hypothesis of at least one grid cell in an occupancy grid.

FIG. 9 shows an overview of the process of updating the occupancy hypothesis of at least one grid cell in an occupancy grid.

In 902, sensor information is received about a location and possibly a velocity of one or more objects detected by a sensor.

In 904, the occupancy grid is stored, and at least one grid cell of the plurality of grid cells is associated with a respective single occupancy hypothesis. Formula (6) may provide an example of a mathematical representation of the occupancy grid. The values that express each single occupancy hypothesis are the belief of occupancy O of the cell, that may be computed from formula (5), and the velocity $V_x$ and $V_y$ that may be computed from formula (7). The relation between the sensor measurements received in process 902 and the degree of belief of occupancy may be expressed mathematically by the formulae (2) to (5). The process of computing the values for the velocities may be expressed mathematically with formulae (7) and (8).

In 906, the single occupancy hypothesis of at least one grid cell is updated with location information detected by a sensor. Such an update may be performed with the Kalman filter as described by formulae (9) to (18).

The Kalman filter, as described above using the formulae (9) to (18), may replace the Particle filter to detect objects positions in DOG implementations. Avoiding the use of Particle Filters may have the advantage to provide the location of objects in the environment of the ego vehicle 100 without requiring the use of any particles. Rather, the analysis is performed exclusively through the use of sensor measurements, the Measurement Matrix (13) and the state transition matrix (14). The resulting solution is purely analytical with predictable complexity and computational requirements.

The perception device 102 may receive sensor measurements from the sensor module and it may transform the sensor measurements directly in updates of none or at least one of the single occupancy hypotheses of a plurality of single occupancy hypothesis. Each single occupancy hypothesis may correspond to at least one grid cell in an occupancy grid, wherein a single occupancy hypothesis may encapsulate in a single information unit, all the information regarding the occupancy of the grid cell corresponding to the single occupancy hypothesis. Furthermore, the update of at least one of a plurality of grid cells in an occupancy grid may be based on formulae (1) to (18) above and more specifically on the Kalman filter.

Such method contrasts with the use of particles in particle filters which may require a much larger number of particles for each grid cell as opposed to a single occupancy hypothesis. The perception devices 102 and the methods that it adopts may therefore reduce the computation required to compute the position of objects around the ego vehicle and more generally to perceive the environment of the ego vehicle.

By its very nature, an occupancy grid tends to be quite sparse in the sense that most of the grid cells have a degree of belief of occupancy of 0 and velocity of $\vec{0}$. In addition, the optimizations introduced in formula (4), and other optimizations pointed out in this description, further increase the scarcity of the occupancy grid by limiting the grid cells that have to be considered, and by pushing low degrees of belief of occupancy to 0. As a result, the matrices manipulated by the Kalman filter may be very sparse and efficiently computed.

In the following, various examples are provided with reference to the aspects described above.

Example 1. is a perception device that may include a receiver configured to receive sensor information comprising information about a location and a velocity of one or more objects detected by a sensor; a memory configured to store an occupancy grid of a predetermined region, wherein the occupancy grid comprises a plurality of grid cells, wherein each grid cell represents an area in the predetermined region, wherein at least one grid cell of the plurality of grid cells is associated with a respective single occupancy hypothesis; and a single occupancy hypothesis determiner configured to determine a single occupancy hypothesis; wherein the single occupancy hypothesis comprises information about a degree of belief of occupancy of the grid cell depending on the sensor information and velocity of the grid cell depending on the sensor information; wherein a contribution of a sensor information value to the degree of belief of occupancy of a grid cell may substantially decreases with an increase of a distance of the location of the object detected by the sensor from a center of the grid cell; and wherein the velocity of the grid cell is dependent on a velocity of one or more objects.

In Example 2., the subject matter of Example 1. may optionally include that the degree of belief of occupancy of a grid cell is a measure of a likelihood that the cell is occupied.

In Example 3., the subject matter of Examples 1. or 2. may optionally include that the degree of belief of occupancy of a grid cell is computed in accordance with the following formula:

$$m_S^i(\{S, D\}) = \begin{cases} \max_j \left( m_{occ_j} e^{-\frac{(x^i - z_t^j)^2}{2\sigma^2}} \right) & \text{if } j' > 0 \\ 0 & \text{else} \end{cases}$$

wherein:
$m_{occ}$ is a constant value in the range [0:1];
i is a grid cells index;
j is a sensor measurements index;
t is a time instant index;
$x^i$ is a center of the i-th grid cell;
$z_t^j$ is a projection of the j-th sensor measurement at time t;
σ is a parameter;
S indicates static occupancy;
D indicates dynamic occupancy;
j' is a value that may be a positive value when $z_t^j$ bearing crosses $x^i$ boundaries.

In Example 4., the subject matter of Examples 1. to 3. may optionally include that the single occupancy hypothesis determiner is configured to determine the degree of belief of occupancy of a grid cell exclusively from the sensor measurements whose bearers cross the cell boundaries; wherein a sensor measurement bearer is the direct line from the sensor to the projection of the sensor measurements.

In Example 5., the subject matter of Examples 1. to 4. may optionally include that the single occupancy hypothesis determiner is configured to substantially decrease a contribution of a sensor information value to the velocity of a grid cell with an increase of a distance of the location of the object detected by the sensor from a center of the grid cell.

In Example 6., the subject matter of Examples 1 to 5. may optionally include that the single occupancy hypothesis determiner may be configured to determine the velocity of a cell n in accordance with the following formula $$v_{t+1}(\text{Cell } n) = \sum_{m=1}^{l} b_n b_m v_t(\text{Cell } m) e^{-\frac{(v_t(\text{cell } m) - v_{gt}(\text{cell } m \to \text{cell } n))^2}{2\sigma^2}}$$

wherein:
l is a number of grid cells in the occupancy grid;
m is an index ranging from 1 to l;
$b_n$ is a degree of belief of occupancy of grid cell n for which the velocity is computed;
$b_m$ is a degree of belief of occupancy of grid cell m in the occupation grid whose velocity contributes to the velocity of grid cell n;
$v_t$(Cell m) is a velocity at time t of grid cell m which effects the velocity of grid cell n;
$v_{t+1}$(Cell n) is an expected velocity of grid cell n at time t+1;
$v_{gt}$(cell m→cell n) is a velocity that the objects in the grid cell m will need to hold to reach grid cell n at time t+1.

In Example 7., the subject matter of Example 6. may optionally include that the single occupancy hypothesis determiner is configured to determine $v_{gt}$(cell m→cell n) in accordance with the following formula:

$$v_{gt}(\text{cell } m \to \text{cell } n) = \frac{dist(\text{cell } m \to \text{cell } n)}{dT}$$

wherein:
dist(cell m→cell n) is a distance from grid cell m to grid cell n;
dT is defined as a time interval from time t to time t+1.

In Example 8., the subject matter of Examples 1. to 7. may optionally include that the single occupancy hypothesis determiner is configured to update the single occupancy hypothesis of at least one grid cell of a plurality of grids cells of an occupancy grid when new sensor information is received.

In Example 9., the subject matter of Examples 1. to 8. may optionally include that the single occupancy hypothesis determiner is configured to update the single occupancy hypothesis of a grid cell by updating the degree of belief of occupancy of the single occupancy hypothesis or the velocity of the single occupancy hypothesis.

In Example 10., the subject matter of Examples 1. to 9. may optionally include that the single occupancy hypothesis determiner is configured to update the single occupancy hypothesis of at least one grid cell using a Kalman filter.

In Example 11., the subject matter of Example 10. may optionally include that the single occupancy hypothesis of at least one grid cell using a Kalman filter configured to receive a measurements vector.

In Example 12., the subject matter of Examples 10. or 11. may optionally include that the single occupancy hypothesis determiner is configured to update the single occupancy hypothesis of at least one grid cell by means of a Kalman filter configured to receive from at least one sensor of a plurality of sensors a measurements vector; wherein the measurements vector comprises an estimate of occupation of each grid cell.

In Example 13., the subject matter of Example 10. to 12. may optionally include that the single occupancy hypothesis determiner is configured to update the single occupancy hypothesis of at least one grid cell by means of a Kalman filter configured to receive from at least one sensor of a plurality of sensors a measurements vector wherein the measurements vector comprises an estimate of the occupancy and an estimate of the velocity of each grid cell.

In Example 14., the subject matter of Examples 10. to 13. may optionally include that the single occupancy hypothesis determiner may be configured to update the single occupancy hypothesis of at least one grid cell by means of a Kalman filter configured to receive a state vector wherein the state vector comprises a single occupancy hypothesis for each cell of a plurality of cells in the occupancy grid.

In Example 15., the subject matter of Examples 10. to 14. may optionally include that the single occupancy hypothesis of at least one grid cell by means of a Kalman filter configured to receive a measurement matrix relating a prediction of the uncertainty in the measurements vector to a prediction uncertainty in the state vector.

In Example 16., the subject matter of Examples 10. to 15. may optionally include that the single occupancy hypothesis determiner is configured to update the single occupancy hypothesis of at least one grid cell by means of a Kalman filter configured to receive a state transition matrix wherein each cell in the matrix comprises an occupancy rate change or of a velocity rate change.

Example 17. is a perception method that may include receiving sensor information comprising information about a location and a velocity of one or more objects detected by a sensor; storing an occupancy grid of a predetermined region, wherein the occupancy grid comprises a plurality of grid cells wherein each grid cell represents an area in the predetermined region, wherein at least one grid cell of the plurality of grid cells is associated with a respective single occupancy hypothesis; determining a single occupancy hypothesis; wherein the single occupancy hypothesis comprises information about a degree of belief of occupancy of the grid cell depending on the sensor information and about a velocity of the grid cell depending on the sensor information; wherein a contribution of a sensor information value to the degree of belief of occupancy of a grid cell substantially decreases with an increase of a distance of the location of the object detected by the sensor from a center of the grid cell, wherein the velocity of the grid cell is dependent on a velocity of one or more objects.

In Example 18., the subject matter of Example 17. may optionally include that the degree of belief of occupancy of a grid cell is a measure of a likelihood that the cell is occupied.

In Example 19., the subject matter of Examples 17 or 18. may optionally include that the degree of belief of occupancy of a grid cell is computed in accordance with the following formula:

$$m_S^i(\{S, D\}) = \begin{cases} \max_j \left( m_{occ_j} e^{-\frac{(x^i - z_t^j)^2}{2\sigma^2}} \right) & \text{if } j' > 0 \\ 0 & \text{else} \end{cases}$$

wherein:
$m_{occ}$ is a constant value in the range [0:1];
i is a grid cells index;
j is a sensor measurements index;
t is a time instant index;
$x^i$ is a center of the i-th grid cell;
$z_t^j$ is a projection of the j-th sensor measurement at time t;

σ is a parameter;
S indicates static occupancy;
D indicates dynamic occupancy;
j' is a value that may be a positive value when $z_t^j$ bearing crosses $x^i$ boundaries.

In Example 20., the subject matter of Examples 17. to 19. may optionally include that degree of belief of occupancy of a grid cell is determined exclusively from the sensor measurements whose bearers cross the cell boundaries; wherein a sensor measurement bearer is the direct line from the sensor to the projection of the sensor measurements.

In Example 21., the subject matter of Examples 17 to 20. may optionally include that a contribution of a sensor information value to the velocity of a grid cell substantially decreases with an increase of a distance of the location of the object detected by the sensor from a center of the grid cell.

In Example 22., the subject matter of Examples 17 to 21. may optionally include that the velocity of a cell n is determined in accordance with the following formula $$v_{t+1}(\text{Cell } n) = \sum_{m=1}^{l} b_n b_m v_t(\text{Cell } m) e^{-\frac{(v_t(\text{cell } m) - v_{gt}(\text{cell } m \rightarrow \text{cell } n))^2}{2\sigma^2}}$$

wherein:
l is a number of grid cells in the occupancy grid;
m is an index ranging from 1 to l;
$b_n$ is a degree of belief of occupancy of grid cell n for which the velocity is computed;
$b_m$ is a degree of belief of occupancy of grid cell m in the occupation grid whose velocity contributes to the velocity of grid cell n;
$v_t$(Cell m) is a velocity at time t of grid cell m which effects the velocity of grid cell n;
$v_{t+1}$(Cell n) is an expected velocity of grid cell n at time t+1;
$v_{gt}$(cell m→cell n) is a velocity that the objects in the grid cell m will need to hold to reach grid cell n at time t+1.

In Example 23., the subject matter of Example 22. may optionally include that wherein, $v_{gt}$(cell m→cell n) is defined as the following:

$$v_{gt}(\text{cell } m \rightarrow \text{cell } n) = \frac{dist(\text{cell } m \rightarrow \text{cell } n)}{dT}$$

wherein:
dist(cell m→cell n) is a distance from grid cell m to grid cell n;
dT is defined as a time interval from time t to time t+1.

In Example 24., the subject matter of Examples 17. to 23. may optionally include that the single occupancy hypothesis of at least one grid cell of a plurality of grids cells of an occupancy grid may be updated when new sensor information is received.

In Example 25., the subject matter of Examples 17. to 24. may optionally include updating the degree of belief of occupancy of the single occupancy hypothesis or the velocity of the single occupancy hypothesis.

In Example 26., the subject matter of Examples 17. to 25. may optionally include updating the single occupancy hypothesis of at least one grid cell is performed by means of a Kalman filter.

In Example 27., the subject matter of Example 26. may optionally include updating the single occupancy hypothesis of at least one grid cell is performed by means of a Kalman filter configured to receive from at least one sensor of a plurality of sensors a measurements vector.

In Example 28., the subject matter of Examples 26. or 27. may optionally include updating the single occupancy hypothesis of at least one grid cell is performed by means of a Kalman filter configured to receive from at least one sensor of a plurality of sensors a measurements vector wherein the measurements vector comprising an estimate of occupation of each grid cell.

In Example 29., the subject matter of Examples 26 to 28. may optionally include updating the single occupancy hypothesis of at least one grid cell is performed by means of a Kalman filter configured to receive from at least one sensor of a plurality of sensors a measurements vector wherein the measurements vector comprises an estimate of the occupation and an estimate of the velocity of each grid cell.

In Example 30., the subject matter of Examples 26 to 29. may optionally include that updating the single occupancy hypothesis of at least one grid cell is performed by means of a Kalman filter configured to receive a state vector describing the single occupancy hypothesis of at least one cell of a plurality of cells in the occupation grid.

In Example 31., the subject matter of Examples 26. to 30. may optionally include updating the single occupancy hypothesis of at least one grid cell comprises using a Kalman filter receiving a measurement matrix relating a prediction of the uncertainty in the measurements vector to a prediction uncertainty in the state vector.

In Example 32., the subject matter of Examples 26. to 31. may optionally include updating the single occupancy hypothesis of at least one grid cell comprises using a Kalman filter receiving a state transition matrix wherein each cell in the matrix comprises of an occupation rate change or of a velocity rate change.

Example 33. is a vehicle that may include a receiver configured to receive sensor information comprising information about a location and a velocity of one or more objects detected by a sensor; a memory configured to store an occupancy grid of a predetermined region, wherein the occupancy grid comprises a plurality of grid cells, wherein each grid cell represents an area in the predetermined region, wherein at least one grid cell of the plurality of grid cells is associated with a respective single occupancy hypothesis; a single occupancy hypothesis determiner configured to determine a single occupancy hypothesis; wherein the single occupancy hypothesis comprises information about a degree of belief of occupancy of the grid cell depending on the sensor information and about a velocity of the grid cell depending on the sensor information; wherein a contribution of a sensor information value to the degree of belief of occupancy substantially decreases with an increase of a distance of the location of the object detected by the sensor from a center of the grid cell; and wherein the velocity of the grid cell is dependent on a velocity of one or more objects.

In Example 34., the subject matter of Example 33. may optionally include that the degree of belief of occupancy of a grid cell is a measure of a likelihood that the cell is occupied.

In Example 35., the subject matter of Examples 33. or 34. may optionally include that the degree of belief of occupancy of a grid cell is computed in accordance with the following formula:

$$m_S^i(\{S, D\}) = \begin{cases} \max_j \left( m_{occ_j} e^{-\frac{(x^i - z_t^j)^2}{2\sigma^2}} \right) & \text{if } j' > 0 \\ 0 & \text{else} \end{cases}$$

wherein:
  $m_{occ}$ is a constant value in the range [0:1];
  i is a grid cells index;
  j is a sensor measurements index;
  t is a time instant index;
  $x^i$ is a center of the i-th grid cell;
  $z_t^j$ is a projection of the j-th sensor measurement at time t;
  σ is a parameter;
  S indicates static occupancy;
  D indicates dynamic occupancy;
  j' is a value that may be a positive value when $z_t^j$ bearing crosses $x^i$ boundaries.

In Example 36., the subject matter of Examples 33. to 35. may optionally include that the single occupancy hypothesis determiner is configured to determine the degree of belief of occupancy of a grid cell exclusively from the sensor measurements whose bearers cross the cell boundaries; wherein a sensor measurement bearer is the direct line from the sensor to the projection of the sensor measurements.

In Example 37., the subject matter of Examples 33. to 36. may optionally include that the single occupancy hypothesis determiner is configured to substantially decrease a contribution of a sensor information value to the velocity of a grid cell with an increase of a distance of the location of the object detected by the sensor from a center of the grid cell.

In Example 38., the subject matter of Examples 33 to 37. may optionally include that the single occupancy hypothesis determiner may be configured to determine the velocity of a cell n in accordance with the following formula $$v_{t+1}(\text{Cell } n) = \sum_{m=1}^{l} b_n b_m v_t(\text{Cell } m) e^{-\frac{(v_t(\text{cell } m) - v_{gt}(\text{cell } m \rightarrow \text{cell } n))^2}{2\sigma^2}}$$

wherein:
  l is a number of grid cells in the occupancy grid;
  m is an index ranging from 1 to l;
  $b_n$ is a degree of belief of occupancy of grid cell n for which the velocity is computed;
  $b_m$ is a degree of belief of occupancy of grid cell m in the occupation grid whose velocity contributes to the velocity of grid cell n;
  $v_t$(Cell m) is a velocity at time t of grid cell m which effects the velocity of grid cell n;
  $v_{t+1}$(Cell n) is an expected velocity of grid cell n at time t+1;
  $v_{gt}$(cell m→cell n) is a velocity that the objects in the grid cell m will need to hold to reach grid cell n at time t+1.

In Example 39., the subject matter of Example 38. may optionally include that the single occupancy hypothesis determiner is configured to determine $v_{gt}$(cell m→cell n) in accordance with the following formula:

$$v_{gt}(\text{cell } m \rightarrow \text{cell } n) = \frac{dist(\text{cell } m \rightarrow \text{cell } n)}{dT}$$

wherein:
  dist(cell m→cell n) is a distance from grid cell m to grid cell n,
  dT is defined as a time interval from time t to time t+1.

In Example 40., the subject matter of Examples 33. to 39. may optionally include that the single occupancy hypothesis determiner is configured to update the single occupancy hypothesis of at least one grid cell of a plurality of grids cells of an occupancy grid when new sensor information is received.

In Example 41., the subject matter of Examples 33. to 40. may optionally include that the single occupancy hypothesis determiner is configured to update the single occupancy hypothesis of a grid cell by updating the degree of belief of occupancy of the single occupancy hypothesis or the velocity of the single occupancy hypothesis.

In Example 42., the subject matter of Examples 33. to 41. may optionally include that the single occupancy hypothesis determiner is configured to update the single occupancy hypothesis of at least one grid cell using a Kalman filter.

In Example 43., the subject matter of Example 42. may optionally include that the single occupancy hypothesis of at least one grid cell using a Kalman filter configured to receive a measurements vector.

In Example 44., the subject matter of Examples 42. or 43. may optionally include that the single occupancy hypothesis determiner is configured to update the single occupancy hypothesis of at least one grid cell by means of a Kalman filter configured to receive from at least one sensor of a plurality of sensors a measurements vector; wherein the measurements vector comprises an estimate of occupation of each grid cell.

In Example 45. the subject matter of Examples 42. to 44. may optionally include that the single occupancy hypothesis determiner is configured to update the single occupancy hypothesis of at least one grid cell by means of a Kalman filter configured to receive from at least one sensor of a plurality of sensors a measurements vector wherein the measurements vector comprises an estimate of the occupancy and an estimate of the velocity of each grid cell.

In Example 46., the subject matter of Examples 42. to 45. may optionally include that the single occupancy hypothesis determiner may be configured to update the single occupancy hypothesis of at least one grid cell by means of a Kalman filter configured to receive a state vector wherein the state vector comprises a single occupancy hypothesis for each cell of a plurality of cells in the occupancy grid.

In Example 47., the subject matter of Examples 42. to 46. may optionally include that the single occupancy hypothesis of at least one grid cell by means of a Kalman filter configured to receive a measurement matrix relating a prediction of the uncertainty in the measurements vector to a prediction uncertainty in the state vector.

In Example 48., the subject matter of Examples 42. to 47. may optionally include that the single occupancy hypothesis determiner is configured to update the single occupancy hypothesis of at least one grid cell by means of a Kalman filter configured to receive a state transition matrix wherein each cell in the matrix comprises an occupancy rate change or of a velocity rate change.

Example 49. is a non-transient computer readable medium for causing one or more processors to implement the method of receiving sensor information comprising information about a location and a velocity of one or more objects detected by a sensor; storing an occupancy grid of a predetermined region, wherein each grid cell represents an area in the predetermined region, wherein at least one grid cell of the plurality of grid cells is associated with a respective single occupancy hypothesis, wherein the single occupancy hypothesis comprises information about a degree of belief of occupancy of the grid cell depending on the sensor information and about a velocity of the grid cell depending on the sensor information; wherein a contribution of a sensor information value to the degree of belief of occupancy substantially decreases with an increase of a distance of the location of the object detected by the sensor from a center of the grid cell, wherein the velocity of the grid cell is dependent on a velocity of one or more objects.

In Example 50., the subject matter of Example 49. may optionally include that the degree of belief of occupancy of a grid cell is a measure of a likelihood that the cell is occupied.

In Example 51., the subject matter of Examples 49 or 50. may optionally include that the degree of belief of occupancy of a grid cell is computed in accordance with the following formula:

$$m^i_S(\{S,D\}) = \begin{cases} \max_j\left(m_{occ_j} e^{-\frac{(x^i - z_t^j)^2}{2\sigma^2}}\right) & \text{if } j' > 0 \\ 0 & \text{else} \end{cases}$$

wherein
  $m_{occ}$ is a constant value in the range [0:1];
  i is a grid cells index;
  j is a sensor measurements index;
  t is a time instant index;
  $x^i$ is a center of the i-th grid cell;
  $z_t^j$ is a projection of the j-th sensor measurement at time t;
  σ is a parameter;
  S indicates static occupancy;
  D indicates dynamic occupancy;
  j' is a value that may be a positive value when $z_t^j$ bearing crosses $x^i$ boundaries.

In Example 52., the subject matter of Examples 49. to 51. may optionally include that degree of belief of occupancy of a grid cell is determined exclusively from the sensor measurements whose bearers cross the cell boundaries; wherein a sensor measurement bearer is the direct line from the sensor to the projection of the sensor measurements.

In Example 53., the subject matter of Examples 49 to 50. may optionally include that a contribution of a sensor information value to the velocity of a grid cell substantially decreases with an increase of a distance of the location of the object detected by the sensor from a center of the grid cell.

In Example 54., the subject matter of Examples 49. to 51. may optionally include that the velocity of a cell n is determined in accordance with the following formula $$v_{t+1}(\text{Cell } n) = \sum_{m=1}^{l} b_n b_m v_t(\text{Cell } m) e^{-\frac{(v_t(\text{cell } m) - v_{gt}(\text{cell } m \rightarrow \text{cell } n))^2}{2\sigma^2}}$$

wherein:
  l is a number of grid cells in the occupancy grid;
  m is an index ranging from 1 to l;
  $b_n$ is a degree of belief of occupancy of grid cell n for which the velocity is computed;

$b_m$ is a degree of belief of occupancy of grid cell m in the occupation grid whose velocity contributes to the velocity of grid cell n;

$v_t(\text{Cell m})$ is a velocity at time t of grid cell m which effects the velocity of grid cell n;

$v_{t+1}(\text{Cell n})$ is an expected velocity of grid cell n at time t+1;

$v_{gt}(\text{cell m} \rightarrow \text{cell n})$ is a velocity that the objects in the grid cell m will need to hold to reach grid cell n at time t+1.

In Example 55., the subject matter of Example 54. may optionally include that wherein, $v_{gt}(\text{cell m} \rightarrow \text{cell n})$ is defined as the following:

$$v_{gt}(\text{cell } m \rightarrow \text{cell } n) = \frac{dist(\text{cell } m \rightarrow \text{cell } n)}{dT}$$

wherein dist(cell m→cell n) is a distance from grid cell m to grid cell n, dT is defined as a time interval from time t to time t+1.

In Example 56., the subject matter of Examples 49. to 55. may optionally include that the single occupancy hypothesis of at least one grid cell of a plurality of grids cells of an occupancy grid may be updated when new sensor information is received.

In Example 57., the subject matter of Examples 49. to 56. may optionally include updating the degree of belief of occupancy of the single occupancy hypothesis or the velocity of the single occupancy hypothesis.

In Example 58., the subject matter of Example 49. may optionally include updating the single occupancy hypothesis of at least one grid cell is performed by means of a Kalman filter.

In Example 59., the subject matter of Example 58. may optionally include updating the single occupancy hypothesis of at least one grid cell is performed by means of a Kalman filter configured to receive from at least one sensor of a plurality of sensors a measurements vector.

In Example 60., the subject matter of Examples 58. or 59. may optionally include updating the single occupancy hypothesis of at least one grid cell is performed by means of a Kalman filter configured to receive from at least one sensor of a plurality of sensors a measurements vector wherein the measurements vector comprising an estimate of occupation of each grid cell.

In Example 61., the subject matter of Examples 58. to 60. may optionally include updating the single occupancy hypothesis of at least one grid cell is performed by means of a Kalman filter configured to receive from at least one sensor of a plurality of sensors a measurements vector wherein the measurements vector comprises an estimate of the occupation and an estimate of the velocity of each grid cell.

In Example 62., the subject matter of Examples 58. to 61. may optionally include that updating the single occupancy hypothesis of at least one grid cell is performed by means of a Kalman filter configured to receive a state vector describing the single occupancy hypothesis of at least one cell of a plurality of cells in the occupation grid.

In Example 63., the subject matter of Examples 58. to 62. may optionally include updating the single occupancy hypothesis of at least one grid cell comprises using a Kalman filter receiving a measurement matrix relating a prediction of the uncertainty in the measurements vector to a prediction uncertainty in the state vector.

In Example 64., the subject matter of Examples 58. to 63. may optionally include updating the single occupancy hypothesis of at least one grid cell comprises using a Kalman filter receiving a state transition matrix wherein each cell in the matrix comprises of an occupation rate change or of a velocity rate change.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A perception device comprising
a receiver configured to receive sensor information comprising information about a location and a velocity of one or more objects detected by a sensor;
a memory configured to store an occupancy grid of a predetermined region, wherein the occupancy grid comprises a plurality of grid cells, wherein each grid cell represents an area in the predetermined region, wherein at least one grid cell of the plurality of grid cells is associated with a respective single occupancy hypothesis; and
a single occupancy hypothesis determiner configured to determine a single occupancy hypothesis;
wherein the single occupancy hypothesis comprises information about a degree of belief of occupancy of a grid cell depending on the sensor information and velocity of the grid cell depending on the sensor information;
wherein a contribution of a sensor information value to the degree of belief of occupancy of a grid cell substantially decreases with an increase of a distance of the location of the object detected by the sensor from a center of the grid cell; and
wherein the velocity of the grid cell is dependent on a velocity of one or more objects.

2. The perception device of claim 1,
wherein the degree of belief of occupancy of a grid cell is a measure of a likelihood that the cell is occupied.

3. The perception device of claim 1,
wherein the degree of belief of occupancy of a grid cell is computed in accordance with the following formula:

$$m_S^i(\{S, D\}) = \begin{cases} \max_j \left( m_{occ_j} e^{-\frac{(x^i - z_t^j)^2}{2\sigma^2}} \right) & \text{if } j' > 0 \\ 0 & \text{else} \end{cases}$$

wherein $m_{occ}$ is a constant value in the range [0:1];

i is a grid cells index;

j is a sensor measurements index;

t is a time instant index;

$x^i$ is a center of the i-th grid cell;

$z_t^j$ is a projection of the j-th sensor measurement at time t;

$\sigma$ is a parameter;

S indicates static occupancy;

D indicates dynamic occupancy;

j' is a value that may be a positive value when $z_t^j$ bearing crosses $x^i$ boundaries.

4. The perception device of claim 3,
wherein the single occupancy hypothesis determiner is configured to determine the degree of belief of occupancy of a grid cell exclusively from the sensor measurements whose bearers cross the cell boundaries; wherein a sensor measurement bearer is the direct line from the sensor to the projection of the sensor measurements.

5. The perception device of claim 1,
wherein the single occupancy hypothesis determiner is configured to substantially decrease a contribution of a sensor information value to the velocity of a grid cell with an increase of a distance of the location of the object detected by the sensor from a center of the grid cell.

6. The perception device of claim 1,
wherein the single occupancy hypothesis determiner is configured to determine the velocity of a cell n in accordance with the following formula $$v_{t+1}(\text{Cell } n) = \sum_{m=1}^{l} b_n b_m v_t(\text{Cell } m) e^{-\frac{(v_t(\text{cell } m) - v_{gt}(\text{cell } m \rightarrow \text{cell } n))^2}{2\sigma^2}}$$

wherein
l is a number of grid cells in the occupancy grid;
m is an index ranging from 1 to l;
$b_n$ is a degree of belief of occupancy of grid cell n for which the velocity is computed;
$b_m$ is a degree of belief of occupancy of grid cell m in the occupation grid whose velocity contributes to the velocity of grid cell n;
$v_t$(Cell m) is a velocity at time t of grid cell m which effects the velocity of grid cell n;
$v_{t+1}$(Cell n) is an expected velocity of grid cell n at time t+1;
$v_{gt}$(cell m→cell n) is a velocity that the objects in the grid cell m will need to hold to reach grid cell n at time t+1.

7. The perception device of claim 6,
wherein the single occupancy hypothesis determiner is configured to determine $v_{gt}$(cell m→cell n) in accordance with the following formula:

$$v_{gt}(\text{cell } m \rightarrow \text{cell } n) = \frac{dist(\text{cell } m \rightarrow \text{cell } n)}{dT}$$

wherein
dist(cell m→cell n) is a distance from grid cell m to grid cell n,
dT is defined as a time interval from time t to time t+1.

8. The perception device of claim 1,
wherein the single occupancy hypothesis determiner is configured to update the single occupancy hypothesis of at least one grid cell of a plurality of grids cells of an occupancy grid when new sensor information is received.

9. The perception device of claim 1,
wherein the single occupancy hypothesis determiner is configured to update the single occupancy hypothesis of a grid cell by updating the degree of belief of occupancy of the single occupancy hypothesis or the velocity of the single occupancy hypothesis.

10. The perception device of claim 1,
wherein the single occupancy hypothesis determiner is configured to update the single occupancy hypothesis of at least one grid cell by means of a Kalman filter.

11. The perception device of claim 10,
wherein the single occupancy hypothesis determiner is configured to update the single occupancy hypothesis of at least one grid cell by means of a Kalman filter configured to receive a measurements vector.

12. The perception device of claim 10,
wherein the single occupancy hypothesis determiner is configured to update the single occupancy hypothesis of at least one grid cell by means of a Kalman filter configured to receive from at least one sensor of a plurality of sensors a measurements vector;
wherein the measurements vector comprises an estimate of occupation of each grid cell.

13. The perception device of claim 10,
wherein the single occupancy hypothesis determiner is configured to update the single occupancy hypothesis of at least one grid cell by means of a Kalman filter configured to receive from at least one sensor of a plurality of sensors a measurements vector wherein the measurements vector comprises an estimate of the occupancy and an estimate of the velocity of each grid cell.

14. The perception device of claim 10,
wherein the single occupancy hypothesis determiner is configured to update the single occupancy hypothesis of at least one grid cell using a Kalman filter configured to receive a state vector wherein the state vector comprises a single occupancy hypothesis for each cell of a plurality of cells in the occupation grid.

15. The perception device of claim 10,
wherein the single occupancy hypothesis determiner is configured to update the single occupancy hypothesis of at least one grid cell by means of a Kalman filter configured to receive a measurement matrix relating a prediction of the uncertainty in the measurements vector to a prediction uncertainty in the state vector.

16. The perception device of claim 10,
wherein the single occupancy hypothesis determiner is configured to update the single occupancy hypothesis of at least one grid cell by means of a Kalman filter configured to receive a state transition matrix wherein each cell in the matrix comprises an occupancy rate change or of a velocity rate change.

17. A vehicle comprising
a receiver configured to receive sensor information comprising information about a location and a velocity of one or more objects detected by a sensor;
a memory configured to store an occupancy grid of a predetermined region, wherein the occupancy grid comprises a plurality of grid cells, wherein each grid cell represents an area in the predetermined region, wherein at least one grid cell of the plurality of grid cells is associated with a respective single occupancy hypothesis;
a single occupancy hypothesis determiner configured to determine a single occupancy hypothesis;
wherein the single occupancy hypothesis comprises information about a degree of belief of occupancy of the grid cell depending on the sensor information and about a velocity of the grid cell depending on the sensor information;
wherein a contribution of a sensor information value to the degree of belief of occupancy substantially decreases with an increase of a distance of the location of the object detected by the sensor from a center of the grid cell; and wherein the velocity of the grid cell is dependent on a velocity of one or more objects.

18. The vehicle of claim 17, wherein the degree of belief of occupancy of a grid cell is a measure of a likelihood that the cell is occupied.

19. A non-transient computer readable medium for causing one or more processors to implement the method of receiving sensor information comprising information about a location and a velocity of one or more objects detected by a sensor;

storing an occupancy grid of a predetermined region, wherein wherein each grid cell represents an area in the predetermined region, wherein at least one grid cell of the plurality of grid cells is associated with a respective single occupancy hypothesis, wherein the single occupancy hypothesis comprises information about a degree of belief of occupancy of the grid cell depending on the sensor information and about a velocity of the grid cell depending on the sensor information;

wherein a contribution of a sensor information value to the degree of belief of occupancy substantially decreases with an increase of a distance of the location of the object detected by the sensor from a center of the grid cell, wherein the velocity of the grid cell is dependent on a velocity of one or more objects.

20. The non-transient computer readable medium of claim 19, wherein the degree of belief of occupancy of a grid cell is a measure of a likelihood that the cell is occupied.

* * * * *